US012418112B2

(12) United States Patent
Park et al.

(10) Patent No.: US 12,418,112 B2
(45) Date of Patent: Sep. 16, 2025

(54) ANTENNA STRUCTURE AND ELECTRONIC DEVICE INCLUDING SAME

(71) Applicant: Samsung Electronics Co., Ltd., Suwon-si (KR)

(72) Inventors: Chanju Park, Suwon-si (KR); Sanghyuk Wi, Suwon-si (KR); Dongjin Jung, Suwon-si (KR); Taeksun Kwon, Suwon-si (KR); Jungwoo Seo, Suwon-si (KR); Junhwa Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 18/361,163

(22) Filed: Jul. 28, 2023

(65) Prior Publication Data

US 2024/0039161 A1 Feb. 1, 2024

(30) Foreign Application Priority Data

Jul. 29, 2022 (KR) ........................ 10-2022-0094741

(51) Int. Cl.
*H01Q 9/04* (2006.01)
*H01Q 1/22* (2006.01)
*H01Q 1/52* (2006.01)

(52) U.S. Cl.
CPC ......... *H01Q 9/0414* (2013.01); *H01Q 1/2283* (2013.01); *H01Q 1/526* (2013.01)

(58) Field of Classification Search
CPC ........ H01Q 1/2283; H01Q 1/38; H01Q 1/526; H01Q 9/0414; H01Q 9/045
See application file for complete search history.

(56) References Cited

U.S. PATENT DOCUMENTS

| | | | | |
|---|---|---|---|---|
| 10,770,793 | B2 | 9/2020 | Ryoo et al. | |
| 11,700,697 | B2 * | 7/2023 | Ariumi | H05K 1/09 174/255 |
| 2008/0024382 | A1 | 1/2008 | Uddin et al. | |
| 2015/0236425 | A1 * | 8/2015 | Sudo | H01Q 9/42 343/700 MS |
| 2016/0126635 | A1 * | 5/2016 | Hamabe | H01Q 1/2283 343/700 MS |
| 2018/0048047 | A1 | 2/2018 | Lee et al. | |
| 2020/0052403 | A1 | 2/2020 | Hong et al. | |
| 2020/0136269 | A1 | 4/2020 | Choi et al. | |
| 2020/0365994 | A1 * | 11/2020 | Clauzier | H01Q 19/138 |
| 2021/0175609 | A1 * | 6/2021 | Ryoo | H01Q 9/42 |
| 2022/0181766 | A1 * | 6/2022 | Mori | H01Q 5/378 |
| 2022/0200149 | A1 * | 6/2022 | Tamrakar | H01Q 9/0457 |
| 2022/0231460 | A1 * | 7/2022 | Markwardt | H01R 13/6582 |
| 2023/0130741 | A1 * | 4/2023 | Itami | H01Q 9/045 343/702 |

(Continued)

FOREIGN PATENT DOCUMENTS

| | | | |
|---|---|---|---|
| KR | 10-2008-0084200 | A | 9/2008 |
| KR | 10-2018-0017867 | A | 2/2018 |

(Continued)

*Primary Examiner* — Thien M Le

(74) *Attorney, Agent, or Firm* — Jefferson IP Law, LLP

(57) ABSTRACT

The disclosure relates to a fifth generation (5G) or a sixth generation (6G) communication system for supporting a higher data transfer rate. A dual polarization patch antenna structure and an electronic device including same are provided.

20 Claims, 25 Drawing Sheets

(56) References Cited

U.S. PATENT DOCUMENTS

| | | | | |
|---|---|---|---|---|
| 2023/0376397 | A1* | 11/2023 | Sun | G06F 11/3452 |
| 2024/0060614 | A1* | 2/2024 | Lee | F21S 41/43 |
| 2024/0421489 | A1* | 12/2024 | Chivukula | H01Q 21/065 |

FOREIGN PATENT DOCUMENTS

| | | | |
|---|---|---|---|
| KR | 10-1939047 | B1 | 1/2019 |
| KR | 10-2020-0046482 | A | 5/2020 |
| WO | 2008/111816 | A1 | 9/2008 |

* cited by examiner

ANTENNA STRUCTURE AND ELECTRONIC DEVICE INCLUDING SAME

CROSS-REFERENCE TO RELATED APPLICATION(S)

This application is based on and claims priority under 35 U.S.C. § 119(a) of a Korean patent application number 10-2022-0094741, filed on Jul. 29, 2022, in the Korean Intellectual Property Office, the disclosure of which is incorporated by reference herein in its entirety.

BACKGROUND

1. Field

The disclosure relates to an antenna structure. More particularly, the disclosure relates to a dual polarization patch antenna structure and an electronic device including same.

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a dual polarization patch antenna structure having a high isolation characteristic and an electronic device including same.

Additional aspects will be set forth in part in the description which follows and, in part, will be apparent from the description, or may be learned by practice of the presented embodiments.

In accordance with an aspect of the disclosure, an antenna module in a wireless communication system is provided. The antenna module includes a multi-layer printed circuit board (PCB) including a first to a sixth layer, a first feed line disposed in a first area of one side surface of the fifth layer of the multi-layer PCB, a second feed line disposed in a second area of the one side surface of the fifth layer to face the first feed line, a first via extending through the first area of the fifth layer and a first area of the fourth layer of the multi-layer PCB, and having one end electrically connected to the first feed line and the other end extending by a first height (h1) in a vertical direction from the first area of the fourth layer, a second via extending through the second area of the fifth layer and a second area of the fourth layer while facing the first via, and having one end electrically connected to the second feed line and the other end extending by the first height (h1) in a vertical direction from the second area of the fourth layer, a third feed line having one end electrically connected to the other end of the first via, and the other end extending horizontally in a first direction from the other end of the first via, a fourth feed line facing the third feed line, having one end electrically connected to the other end of the second via, and extending horizontally in a second direction from the other end of the second via, a third via having one end electrically connected to the other end of the third feed line, and the other end configured to extend through a fourth area of the third layer and extend by a second height (h2) in a vertical direction, a fourth via facing the third via, and having one end electrically connected to the other end of the fourth feed line and the other end configured to extend through the fourth area of the fourth layer and extend by the second height (h2) in a vertical direction, a first antenna patch having a lower surface electrically connected to the other end of the third via and the other end of the fourth via, and a second antenna patch spaced apart by a predetermined third height (h3) from an upper surface of the first antenna patch. A spaced distance between the first via and the second via may be greater than a spaced distance between the third via and the fourth via.

The first via includes a (1a)th via pad disposed in the first area of the fifth layer and physically coupled to one end of the first via, a (1b)th via pad disposed in the first area of the fourth layer and physically coupled to a middle step of the first via, and a (1c)th via pad physically connected to the other end of the first via.

The second via includes a (2a)th via pad disposed in the second area of the fifth layer and physically coupled to one end of the second via, a (3b)th via pad disposed in the second area of the fifth layer and physically coupled to a middle step of the second via, and a (3c)th via pad physically connected to the other end of the second via.

The third via includes a (3a)th via pad physically coupled to one end of the third via, and a (3b)th via pad physically coupled to the other end of the third via and embedded in a lower surface of a probe pad.

The fourth via includes a (4a)th via pad physically coupled to one end of the fourth via, and a (4b)th via pad physically coupled to the other end of the fourth via and embedded in a second area of a lower surface of a probe pad.

The first feed line and the second feed line may be electrically connected to a radio frequency integrated circuit (RFIC).

A first signal output from the RFIC may be emitted through the second antenna patch via the first feed line, the first via, the third feed line, the third via, and a first area of the first antenna patch.

A second signal output from the RFIC may be emitted through the second antenna patch via the second feed line, the second via, the fourth feed line, the fourth via, and a second area of the first antenna patch.

A first shielding structure configured to surround a first side surface, a second side surface, and an upper surface of the first via, and a second shielding structure configured to surround a first side surface, a second side surface, and an upper surface of the third via may be included therein. The first shielding structure and the second shielding structure may be arranged symmetrically with each other.

The first shielding structure includes a first shielding via spaced apart by a predetermined distance from the first side surface of the first via, a second shielding via spaced apart by a predetermined distance from the second side surface of the first via, and a first shielding cover configured to extend from one end of the first shielding via to one end of the second shielding via and spaced apart by a predetermined distance from the upper surface of the first via.

The first shielding via may be configured to extend from the third layer to a height which is substantially equal to the first antenna patch. The second shielding via may be configured to extend from the third layer to a height which is substantially equal to the first antenna patch.

The first shielding cover may be disposed at a height which is substantially equal to the first antenna patch so as to be substantially parallel to a first side surface of the first antenna patch.

The second shielding structure includes a third shielding via spaced apart by a predetermined distance from the first side surface of the second via, a fourth shielding via spaced apart by a predetermined distance from the second side surface of the third via, and a second shielding cover configured to extend from one end of the third shielding via to one end of the fourth shielding via and spaced apart by a predetermined distance from the upper surface of the second via.

The third shielding via may be configured to extend from the third layer to a height which is substantially equal to the first antenna patch. The fourth shielding via may be configured to extend from the third layer to a height which is substantially equal to the first antenna patch.

The second shielding cover may be disposed at a height which is substantially equal to the first antenna patch so as to be substantially parallel to the second side surface of the first antenna patch.

A third shielding structure configured to surround a third side surface of the first via, and a fourth shielding structure configured to surround a third side surface of the third via may be included therein. The third shielding structure and the fourth shielding structure may be arranged symmetrically with each other.

The third shielding structure includes a fifth shielding via spaced apart by a predetermined distance from the third side surface of the first via, and a third shielding cover configured to extend from one end of the fifth shielding via to the first shielding structure.

The fifth shielding via may be configured to extend from the third layer to a height which is substantially equal to the first antenna patch. The third shielding cover may be disposed at a height which is substantially equal to the first antenna patch so as to be substantially perpendicular to a first side surface of the first antenna patch on a x-y plane.

The fourth shielding structure includes a sixth shielding via spaced apart by a predetermined distance from the third side surface of the third via, and a fourth shielding cover configured to extend from one end of the sixth shielding via to the second shielding structure.

The sixth shielding via may be configured to extend from the third layer to a height which is substantially equal to a probe pad.

The fourth shielding cover may be disposed at a height which is substantially equal to the probe pad so as to be substantially perpendicular to a second side surface of the probe pad on an x-y plane.

According to the disclosure, isolation characteristics between antenna ports can be improved through a dual polarization patch antenna structure and an electronic device including same.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to "a component surface" includes reference to one or more of such surfaces.

Figure 1:
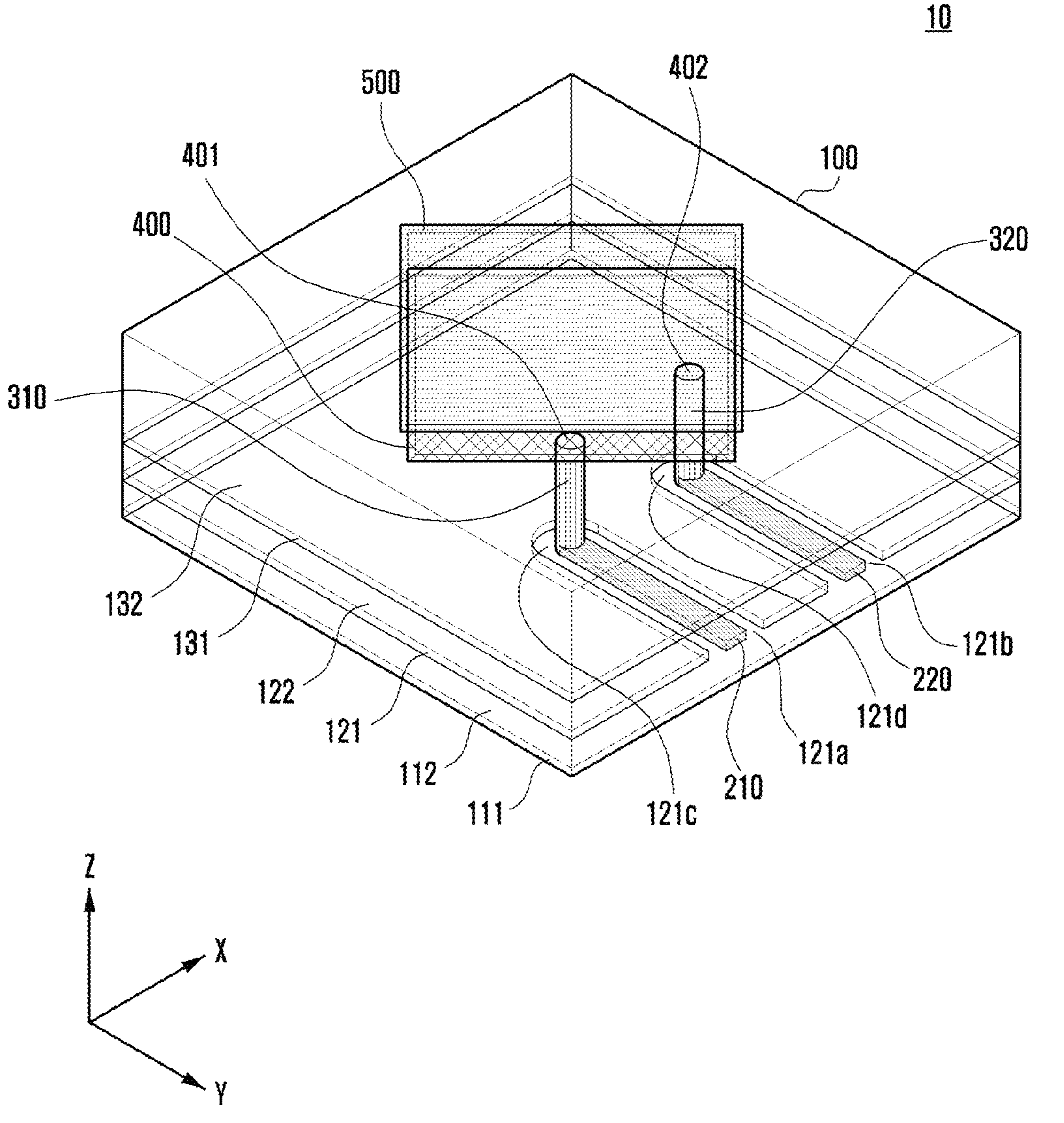
FIG. 1 is a perspective view showing an antenna structure according to an embodiment of the disclosure.

FIG. 1 is a perspective view showing an antenna structure according to an embodiment of the disclosure.

Referring to FIG. 1, an antenna structure 10 may include a multi-layer printed circuit board (PCB) 100, a first feed line 210, a second feed line 220, and a first via 310, a second via 320, a first antenna patch 400, and a second antenna patch 500. The first antenna patch 400 may be referred to as a lower antenna patch. The second antenna patch 500 may be referred to as an upper antenna patch.

The multi-layer PCB 100 may include a first substrate 111, a second substrate 121, a third substrate 131, a first dielectric layer 112, a second dielectric layer 122, and a third dielectric layer 132. For example, the first dielectric layer 112 may be disposed on the upper surface of the first substrate 111. The second substrate 121 may be disposed on the upper surface of the first dielectric layer 112. The second dielectric layer 122 may be disposed on the upper surface of the second substrate 121. The third substrate 131 may be disposed on the upper surface of the second dielectric layer 122. The third dielectric layer 132 may be disposed on the upper surface of the third substrate 131.

The first feed line 210 may be disposed in a (2a)th groove 121*a* of the second substrate 121. The (2a)th groove 121*a* may be referred to as a (2a)th area 121*a*. The first feed line 210 or one end of the first feed line 210 may be referred to as a first port. One end of the first feed line 210 may be electrically connected to a separate first port (not shown).

The other end of the first feed line 210 may be electrically connected to one end of the first via 310. The other end of the first feed line 210 may be electrically connected to one end of the first via 310 in a (2c)th groove 121*c* of the second substrate 121. The (2c)th groove 121*c* may be referred to as a (2c)th area 121*c*.

The second feed line 220 may be disposed in a (2b)th groove 121*b* of the second substrate 121. The (2b)th groove 121*b* may be referred to as a (2b)th area 121*b*. The second feed line 220 or one end of the second feed line 220 may be referred to as a second port. One end of the second feed line 220 may be electrically connected to a separate second port (not shown).

The other end of the second feed line 220 may be electrically connected to one end of the second via 320. The other end of the second feed line 220 may be electrically connected to the other end of the second via 320 in a (2d)th groove 121*d* of the second substrate 121. The (2d)th groove 121*d* may be referred to as a (2d)th area 121*d*.

The first via 310 may be disposed at the lower end of the first antenna patch 400. The other end of the first via 310 may be electrically connected to a first area 401 of the lower surface of the first antenna patch 400. The first via 310 may extend through a part of each of the second dielectric layer 122, the third substrate 131, and the third dielectric layer 132 to be electrically connected to the first area 401 of the lower surface of the first antenna patch 400. For example, the first via 310 may extend through a (3c)th groove 131*c* of the third substrate 131 and a part of the third dielectric layer 132 to be electrically connected to the first area 301 of the lower surface of the first antenna patch 400. The first via 310 may be referred to as a first probe feed.

The second via 320 may be disposed at the lower end of the second antenna patch 500. The other end of the second via 320 may be electrically connected to a second area 402 of the lower surface of the second antenna patch 500. The second via 320 may extend through a part of each of the second dielectric layer 122, the third substrate 131, and the third dielectric layer 132 to be electrically connected to the second area 402 of the lower surface of the first antenna patch 400. For example, the second via 320 may extend through a (3d)th groove 131*d* of the third substrate 131 and a part of the third dielectric layer 132 to be electrically connected to the second area 402 of the lower surface of the first antenna patch 400. The second via may be referred to as a second probe feed.

The first antenna patch 400 may be disposed on the lower end of the second antenna patch 500. The first antenna patch 400 may be disposed between the third substrate 131 and the second antenna patch 500. The first antenna patch 400 may be disposed inside the third dielectric layer 132. The first antenna patch 400 may be physically separated from the second antenna patch 500. The first antenna patch 400 may be electromagnetically coupled to the second antenna patch 500.

The second antenna patch 500 may be disposed on the upper surface of the multi-layer PCB 100. The second antenna patch 500 may be disposed on the upper surface of the third dielectric layer 132.

Figure 2:
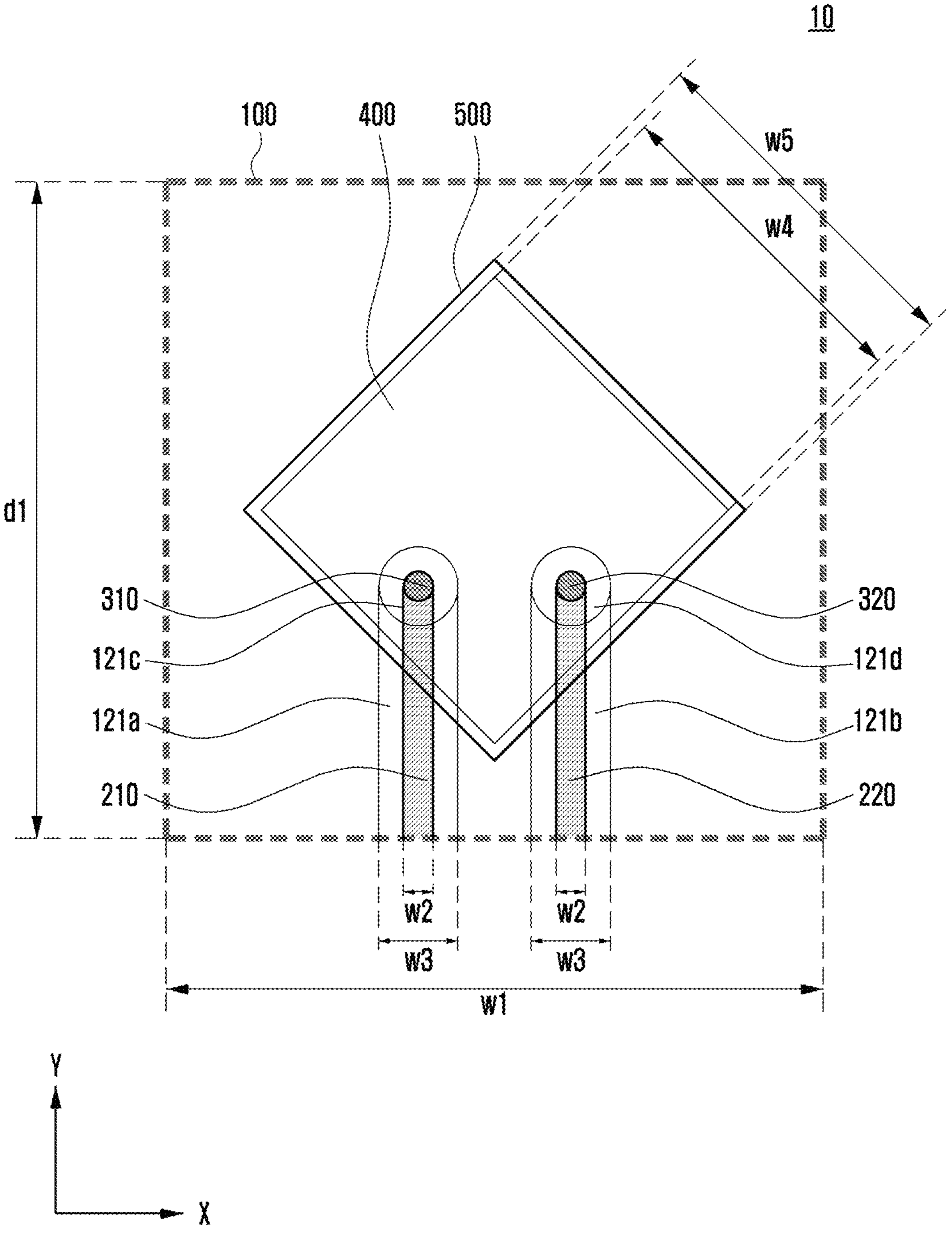
FIG. 2 is a plan view showing an antenna structure with reference to the x-y axis according to an embodiment of the disclosure.

FIG. 2 is a plan view showing an antenna structure 10 with reference to the x-y axis according to an embodiment of the disclosure.

Referring to FIG. 2, a horizontal length w1 of the multi-layer PCB 100 may be determined based on at least one of an operation frequency of the antenna structure 10 and a minimum limitation in the process at the time of manufacturing thereof. For example, in case that the operation frequency of the antenna structure 10 is 140 GHz, the horizontal length w1 of the multi-layer PCB 100 may be approximately 910 μm. A vertical length d1 of the multi-layer PCB 100 may be determined based on at least one of an operation frequency of the antenna structure 10 and a minimum limitation in the process at the time of manufacturing thereof. For example, in case that an operation frequency of the antenna structure 10 is 140 GHz, the vertical length d1 of the multi-layer PCB 100 may be approximately 910 μm.

The first antenna patch 400 and the second antenna patch 500 may be arranged to overlap each other in the z-axis direction. A horizontal length w5 of the second antenna patch 500 may be equal to or different from a horizontal length w4 of the first antenna patch 400. For example, the horizontal length w5 of the second antenna patch 500 may be greater than the horizontal length w4 of the first antenna patch 400, but it is not limited thereto. For example, the horizontal length w5 of the second antenna patch 500 may be determined based on at least one of an operation frequency of the antenna structure 10 and a minimum limitation in the process at the time of manufacturing thereof. For example, in case that an operation frequency of the antenna structure 10 is 140 GHz, the horizontal length w5 of the second antenna patch 500 may be approximately 490 μm. For example, the horizontal length w4 of the first antenna patch 400 may be determined based on at least one of an operation frequency of the antenna structure 10 and a minimum limitation in the process at the time of manufacturing thereof. For example, in case that an operation frequency of the antenna structure 10 is 140 GHz, the horizontal length w4 of the first antenna patch 400 may be approximately 460 μm. The vertical length of the second antenna patch 500 may be equal to or different from the vertical length of the first antenna patch 400. For example, the vertical length of the second antenna patch 500 may be greater than the vertical length of the first antenna patch 400, but it is not limited thereto.

The (2c)th groove 121*c* of the second substrate 121 and the (3c)th groove 131*c* of the third substrate 131 may be arranged to overlap each other in the z-axis direction. A diameter w3 of the (2c)th groove 121*c* of the second substrate 121 may be equal to or similar to the diameter of the (3c)th groove 131*c* of the third substrate 131. For example, the diameter w3 of the (2c)th groove 121*c* may be determined based on at least one of an operation frequency of the antenna structure 10 and a minimum limitation in the process at the time of manufacturing thereof. For example, in case that an operation frequency of the antenna structure 10 is 140 GHz, the diameter w3 of the (2c)th groove 121*c* may be approximately 120 μm.

The (2d)th groove 121*d* of the second substrate 121 and the (3d)th groove 131*d* of the third substrate 131 may be arranged to overlap each other in the z-axis direction. A diameter w3 of the (2d)th groove 121*d* of the second substrate 121 may be equal to or similar to the diameter of the (3d)th groove 131*d* of the third substrate 131. For example, the diameter w3 of the (2d)th groove 121*d* may be determined based on at least one of an operation frequency of the antenna structure 10 and a minimum limitation in the process at the time of manufacturing thereof.

A diameter w2 of the cross section of the first via 310 with reference to the x-y axis may be smaller than the diameter w3 of the (2c)th groove 121*c* of the second substrate 121 or the diameter of the (3c)th groove 131*c* of the third substrate 131. For example, the diameter w2 of the cross section of the first via 310 with reference to the x-y axis may be determined based on at least one of an operation frequency of the antenna structure 10 and a minimum limitation in the process at the time of manufacturing thereof. For example, in case that an operation frequency of the antenna structure 10 is 140 GHz, the diameter w2 of the cross section of the first via 310 with reference to the x-y axis may be approximately 40 μm.

The diameter w2 of the cross section of the second via 320 with reference to the x-y axis may be smaller than the diameter w3 of the (2d)th groove 121*d* of the second substrate 121 or the diameter of the (3d)th groove 131*d* of the third substrate 131. For example, the diameter w2 of the cross section of the second via 320 with reference to the x-y axis may be determined based on at least one of an operation frequency of the antenna structure 10 and a minimum limitation in the process at the time of manufacturing thereof.

The width w2 of the first feed line 210 may be smaller than the width w3 of the (2a)th groove 121*a*. The width of the second feed line 220 may be smaller than the width of the (2b)th groove 121*b*. For example, the width w2 of the first feed line 210 may be determined based on at least one of an operation frequency of the antenna structure 10 and a minimum limitation in the process at the time of manufacturing thereof. For example, the width w2 of the second feed line 220 may be determined based on at least one of an operation frequency of the antenna structure 10 and a minimum limitation in the process at the time of manufacturing thereof.

Figure 3:
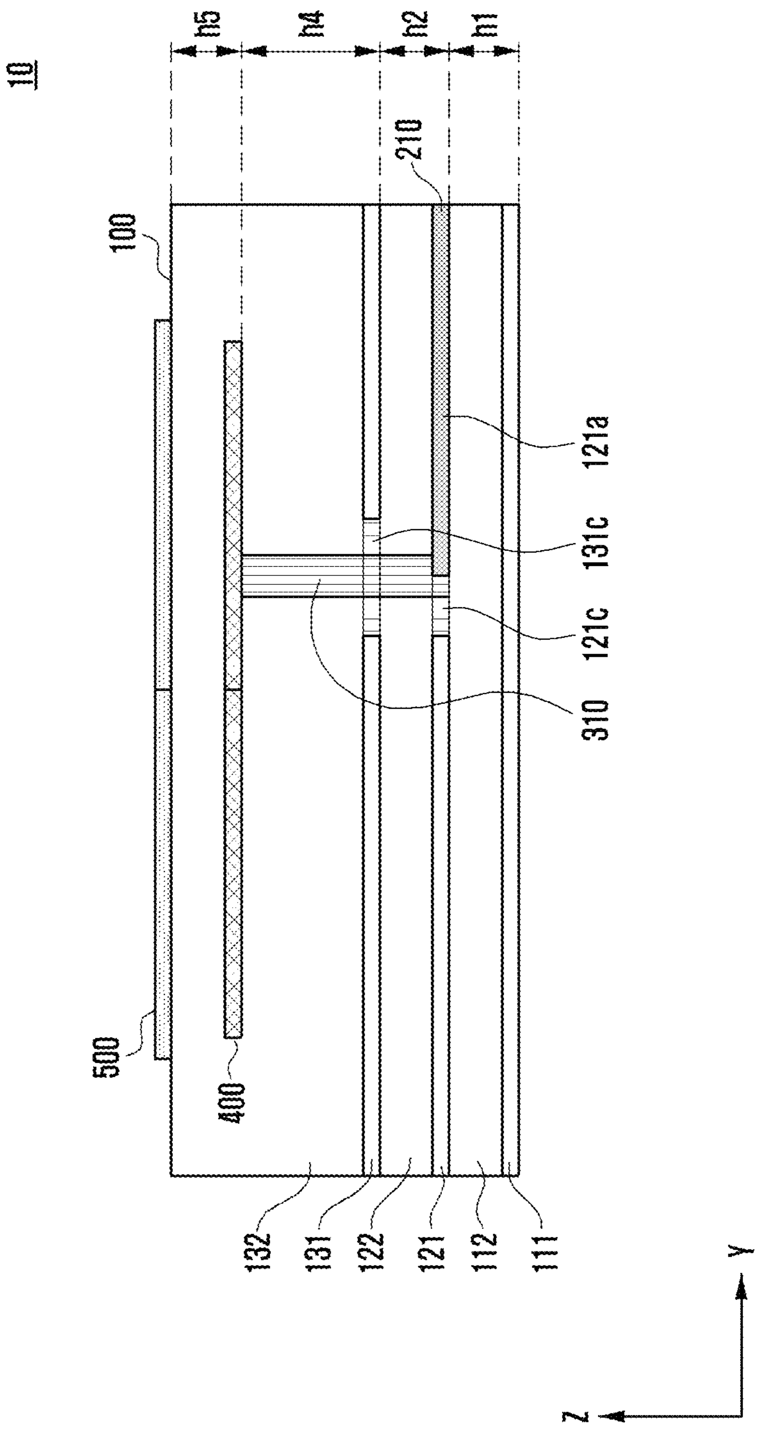
FIG. 3 is a cross-sectional view showing an antenna structure with reference to the x-z axis according to an embodiment of the disclosure.

FIG. 3 is a cross-sectional view showing an antenna structure with reference to the y-z axis according to an embodiment of the disclosure.

Figure 4:
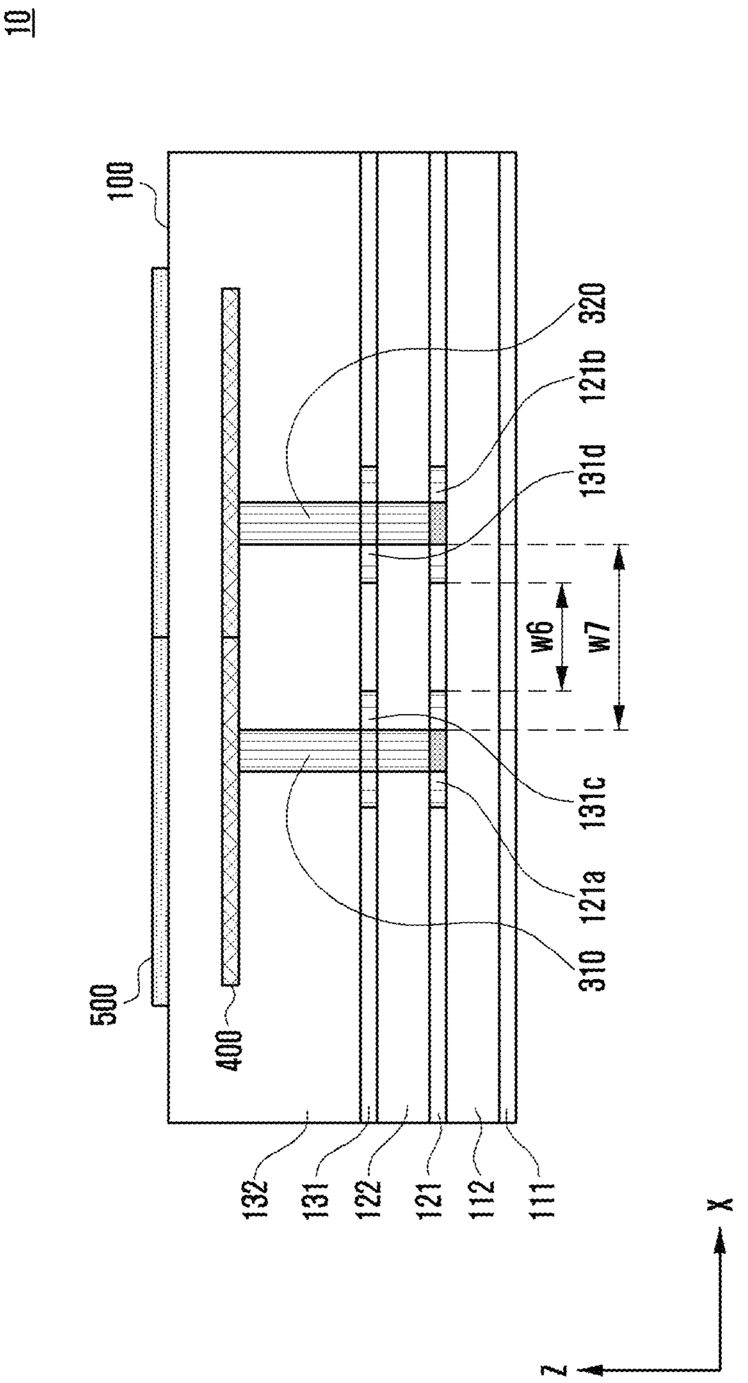
FIG. 4 is a cross-sectional view showing an antenna structure with reference to the y-z axis according to an embodiment of the disclosure.

FIG. 4 is a cross-sectional view showing an antenna structure with reference to the x-z axis according to an embodiment of the disclosure.

Referring to FIGS. 3 and 4, the multi-layer PCB 100 may include a first to a fifth layer. For example, the first layer of the multi-layer PCB 100 may correspond to the second antenna patch 500. The second layer of the multi-layer PCB 100 may correspond to the first antenna patch 400. The third layer of the multi-layer PCB 100 may correspond to the third substrate 131. The fourth layer of the multi-layer PCB 100 may correspond to the second substrate 121. The fifth layer of the multi-layer PCB 100 may correspond to the first substrate 111.

The first substrate 111 and the second substrate 121 may be spaced apart by a predetermined height h1 from each other. For example, the predetermined height h1 may be determined based on at least one of an operation frequency of the antenna structure 10 and a minimum limitation in the process at the time of manufacturing thereof. For example, in case that an operation frequency of the antenna structure 10 is 140 GHz, the predetermined height h1 may be approximately 50 μm. The first dielectric layer 112 may be filled between the first substrate 111 and the second substrate 121.

The second substrate 121 and the third substrate 131 may be spaced apart by a predetermined height h2 from each other. For example, the predetermined height h2 may be determined based on at least one of an operation frequency of the antenna structure 10 and a minimum limitation in the process at the time of manufacturing thereof. For example, in case that an operation frequency of the antenna structure 10 is 140 GHz, the predetermined height h2 may be approximately 50 μm. The second dielectric layer 122 may be filled between the second substrate 121 and the third substrate 131.

The third dielectric layer 132 may be filled on the upper surface of the third substrate 131. The first antenna patch 400 may be embedded in the third dielectric layer 132. The first antenna patch 400 may be disposed to be spaced apart by a predetermined height h4 from the third substrate 131. For example, the predetermined height h4 may be determined based on at least one of an operation frequency of the antenna structure 10 and a minimum limitation in the process at the time of manufacturing thereof. For example, in case that an operation frequency of the antenna structure 10 is 140 GHz, the predetermined height h4 may be approximately 115 μm.

The second antenna patch 500 may be disposed to be spaced apart by a predetermined height h5 from the first antenna patch 400. For example, the predetermined height h5 may be determined based on at least one of an operation frequency of the antenna structure 10 and a minimum limitation in the process at the time of manufacturing thereof. For example, in case that an operation frequency of the antenna structure 10 is 140 GHz, the predetermined height h5 may be approximately 50 μm.

The thickness of each of the first antenna patch 400, the second antenna patch 500, the first substrate 111, the second substrate 121, the third substrate 131, the first dielectric layer 112, and the second dielectric layer 122, that is, the height thereof with reference to the z-axis may be approximately 15 μm.

The first via 310 may electrically connect the first antenna patch 400 and the first feed line 210. One end of the first feed line 210 may be electrically connected to the first port. The other end of the first feed line 210 may be electrically connected to one end of the first via 310.

The second via 320 may electrically connect the first antenna patch 400 and the second feed line 220. One end of the second feed line 220 may be electrically connected to the second port. The other end of the second feed line 220 may be electrically connected to one end of the second via 320.

The (2a)th groove 121*a* and the (2b)th groove 121*b* of the second substrate 121 may be spaced apart by a predetermined distance w6 from each other in the x-axis direction. For example, the predetermined distance w6 may be determined based on at least one of an operation frequency of the antenna structure 10 and a minimum limitation in the process at the time of manufacturing thereof. For example, in case that an operation frequency of the antenna structure 10 is 140 GHz, the predetermined distance w6 may be approximately 70 μm.

The (3c)th groove 131*c* and the (3d)th groove 131*d* of the third substrate 131 may be spaced apart by the predetermined distance w6 from each other in the x-axis direction. For example, the predetermined distance w6 may be determined based on at least one of an operation frequency of the antenna structure 10 and a minimum limitation in the process at the time of manufacturing thereof.

The first via 310 and the second via 320 may be spaced apart by a predetermined distance w7 from each other in the x-axis direction. For example, the predetermined distance w7 may be determined based on at least one of an operation frequency of the antenna structure 10 and a minimum limitation in the process at the time of manufacturing thereof. For example, in case that an operation frequency of the antenna structure 10 is 140 GHz, the predetermined distance w7 may be approximately 130 μm.

Figure 5:
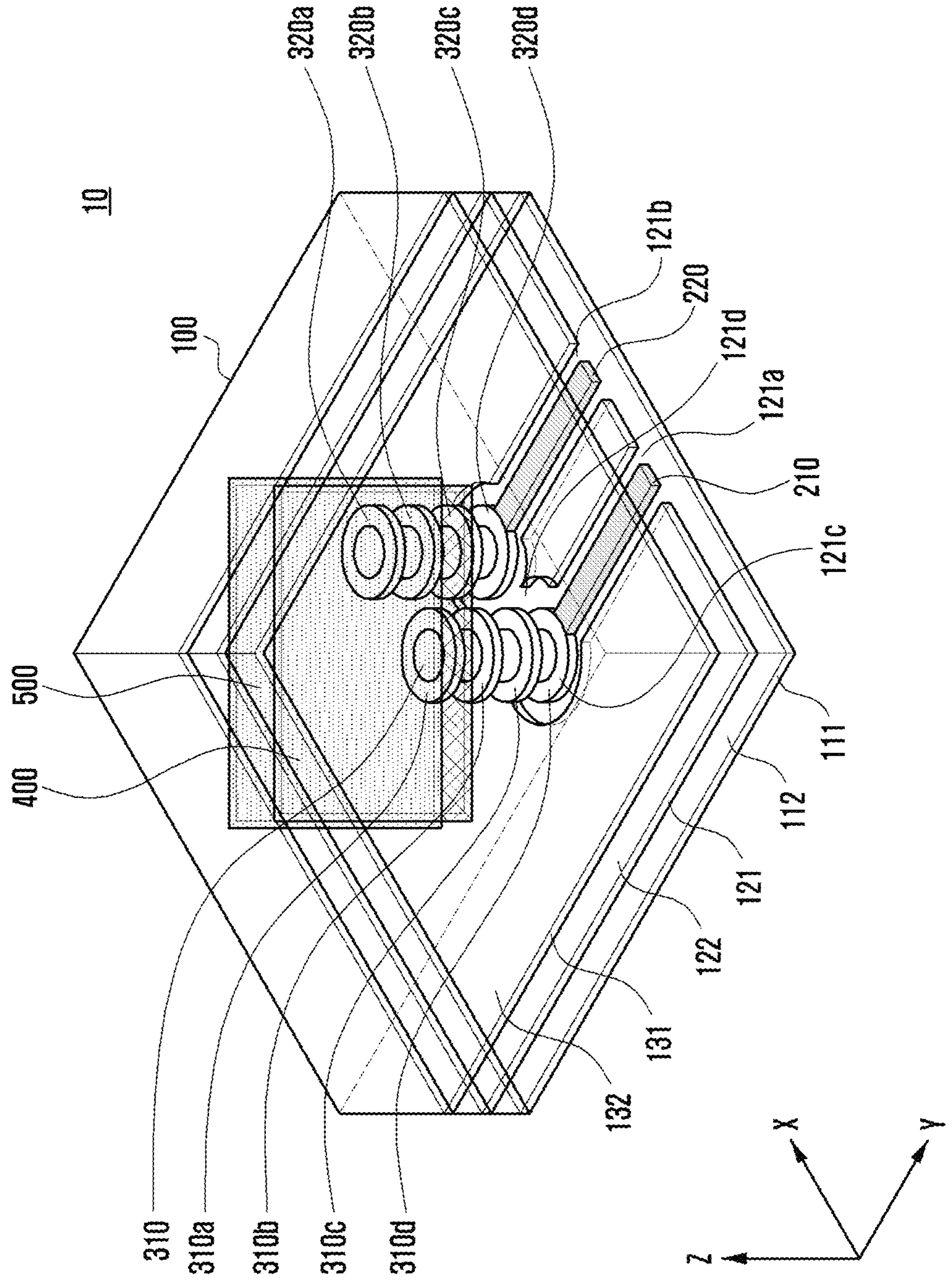
FIG. 5 is a perspective view showing an antenna structure according to an embodiment of the disclosure.

FIG. 5 is a perspective view showing an antenna structure according to an embodiment of the disclosure.

Referring to FIG. 5, the antenna structure 10 may include a multi-layer PCB 100, a first feed line 210, a second feed line 220, a first via 310, a second via 320, a (1a)th via pad 310*a*, a (1b)th via pad 310*b*, a (1c)th via pad 310*c*, a (1d)th via pad 310*d*, a (2a)th via pad 320*a*, a (2b)th via pad 320*b*, a (2c)th via pad 320*c*, a (2d)th via pad 320*d*, a first antenna patch 400, and a second antenna patch 500.

The first via 310 may be physically coupled to the (1a)th via pad 310*a*, the (1b)th via pad 310*b*, the (1c)th via pad 310*c*, and the (1d)th via pad 310*d*. For example, the first via 310 may be divided into a first step to a fourth step with reference to the z-axis. For example, the (1a)th via pad 310*a* may be physically coupled to the first step of the first via 310. The (1b)th via pad 310*b* may be physically coupled to the second step of the first via 310. The (1c)th via pad 310*c* may be physically coupled to the third step of the first via 310. The (1d)th via pad 310*d* may be physically coupled to the fourth step of the first via 310. The first via 310 may be referred to as a first probe feed.

The second via 320 may be physically coupled to the (2a)th via pad 320*a*, the (2b)th via pad 320*b*, the (2c)th via pad 320*c*, and the (2d)th via pad 320*d*. For example, the second via 320 may be divided into a first step to a fourth step with reference to the z-axis. For example, the (2a)th via pad 320*a* may be physically coupled to the first step of the second via 320. The (2b)th via pad 320*b* may be physically coupled to the second step of the second via 320. The (2c)th via pad 320*c* may be physically coupled to the third step of the second via 320. The (2d)th via pad 320*d* may be physically coupled to the fourth step of the second via 320. The second via 320 may be referred to as a second probe feed.

The (1a)th via pad 310*a* may be disposed in the (2c)th groove 121*c* of the second substrate 121. The (1b)th via pad 310*b* may be disposed in the (3c)th groove 131*c* of the third substrate 131. The (1d)th via pad 310*d* may be physically coupled to the first antenna patch 400. The first antenna patch 400 may include the (1d)th via pad 310*d*.

The (2a)th via pad 320*a* may be disposed in the (2d)th groove 121*d* of the second substrate 121. The (2b)th via pad 320*b* may be disposed in the (3d)th groove 131*d* of the third substrate 131. The (2d)th via pad 320*d* may be physically coupled to the first antenna patch 400. The first antenna patch 400 may include the (2d)th via pad 320*d*.

Figure 6:
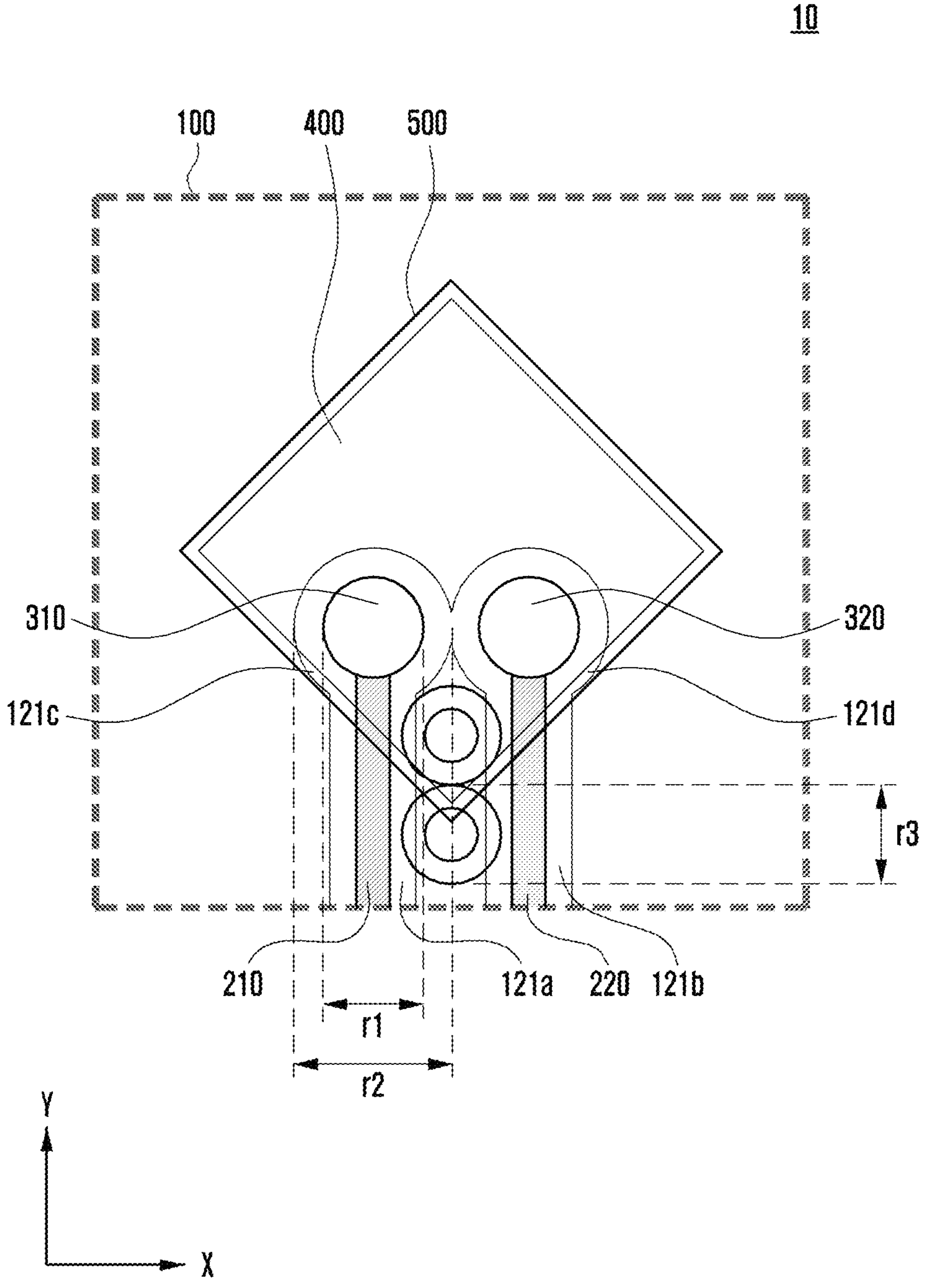
FIG. 6 is a plan view showing an antenna structure with reference to the x-y axis according to an embodiment of the disclosure.

FIG. 6 is a plan view showing an antenna structure with reference to the x-y axis according to an embodiment of the disclosure.

Referring to FIG. 6, the (1a)th via pad 310*a*, the (1b)th via pad 310*b*, the (1c)th via pad 310*c*, and the (1d)th via pad 310*d* may be arranged to overlap each other in the z-axis direction. A diameter r1 of the (1a)th via pad 310*a*, a diameter of the (1b)th via pad 310*b*, a diameter of the (1c)th via pad 310*c*, and a diameter of the (1d)th via pad 310*d* may be mutually equal or similar. For example, the diameter r1 of the (1a)th via pad 310*a* may be determined based on at least one of an operation frequency of the antenna structure 10 and a minimum limitation in the process at the time of manufacturing thereof. For example, in case that an operation frequency of the antenna structure 10 is 140 GHz, the diameter r1 of the (1a)th via pad 310*a* may be approximately 130 μm.

The (2a)th via pad 320*a*, the (2b)th via pad 320*b*, the (2c)th via pad 320*c*, and the (2d)th via pad 320*d* may be arranged to overlap each other in the z-axis direction. A diameter of the (2a)th via pad 320*a*, a diameter of the (2b)th via pad 320*b*, a diameter of the (2c)th via pad 320*c*, and a diameter of the (2d)th via pad 320*d* may be mutually equal or similar. For example, the diameter of the (2a)th via pad 320*a* may be equal to or similar to the diameter r1 of the (1a)th via pad 310*a*.

The (2c)th groove 121*c* of the second substrate 121 and the (3c)th groove 131*c* of the third substrate 131 may be arranged to overlap each other in the z-axis direction. A diameter r2 of the (2c)th groove 121*c* of the second substrate 121 may be equal to or similar to the diameter of the (3c)th groove 131*c* of the third substrate 131. For example, the diameter r2 of the (2c)th groove 121*c* may be determined based on at least one of an operation frequency of the antenna structure 10 and a minimum limitation in the process at the time of manufacturing thereof. For example, in case that an operation frequency of the antenna structure 10 is 140 GHz, the diameter r2 of the (2c)th groove 121*c* may be approximately 210 μm.

The (2d)th groove 121*d* of the second substrate 121 and the (3d)th groove 131*d* of the third substrate 131 may be arranged to overlap each other in the z-axis direction. The diameter of the (2d)th groove 121*d* of the second substrate 121 may be equal to or similar to the diameter of the (3d)th groove 131*d* of the third substrate 131. For example, the diameter of the (2d)th groove 121*d* may be equal to or similar to the diameter r2 of the (2c)th groove 121*c*.

The diameter r1 of each of the (1a)th via pad 310*a*, the (1b)th via pad 310*b*, the (1c)th via pad 310*c*, and the (1d)th via pad 310*d* may be smaller than the diameter r2 of the (2c)th groove 121*c* of the second substrate 121 or the diameter of the (3c)th groove 131*c* of the third substrate 131.

The diameter of each of the (2a)th via pad 320*a*, the (2b)th via pad 320*b*, the (2c)th via pad 320*c*, and the (2d)th via pad 320*d* may be smaller than the diameter of the (2b)th groove 121*b* of the second substrate 121 or the diameter of the (3b)th groove 131*b* of the third substrate 131.

The antenna structure 10 according to the disclosure may further include a ground via. For example, the ground via may be disposed between the first feed line 210 and the second feed line 220. The ground via may be disposed to overlap a partial area of the (2a)th groove 121*a* of the second substrate 121 and a partial area of the (2b)th groove 121*b* of the second substrate 121, in the z-axis direction.

The width r3 of the ground via may be equal to or similar to the diameter r1 of each of the (1a)th via pad 310*a*, the (1b)th via pad 310*b*, the (1c)th via pad 310*c*, and the (1d)th via pad 310*d*, or the diameter of each of the (2a)th via pad 320*a*, the (2b)th via pad 320*b*, the (2c)th via pad 320*c*, and the (2d)th via pad 320*d*.

Figure 7:
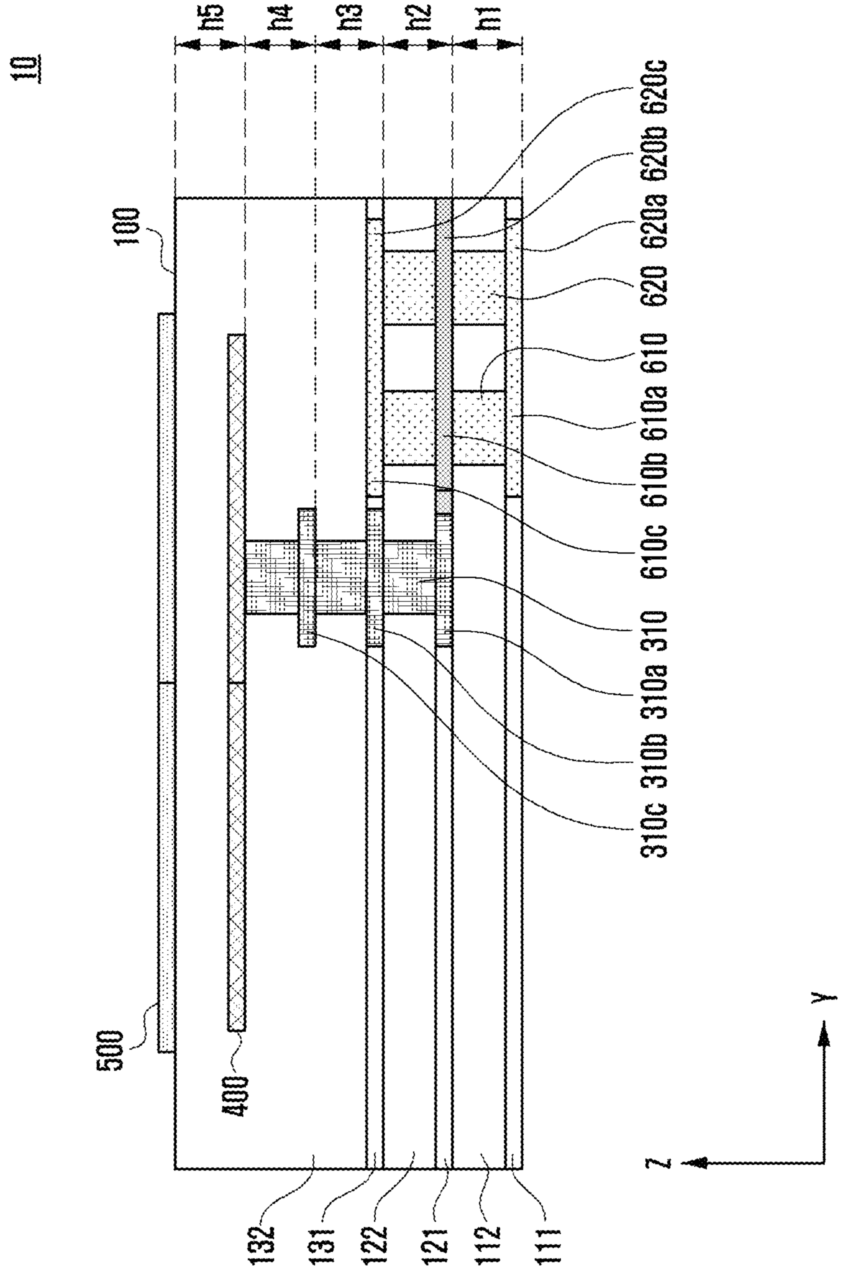
FIG. 7 is a cross-sectional view showing an antenna structure with reference to the x-z axis according to an embodiment of the disclosure.

FIG. 7 is a cross-sectional view showing an antenna structure with reference to the y-z axis according to an embodiment of the disclosure.

Figure 8:
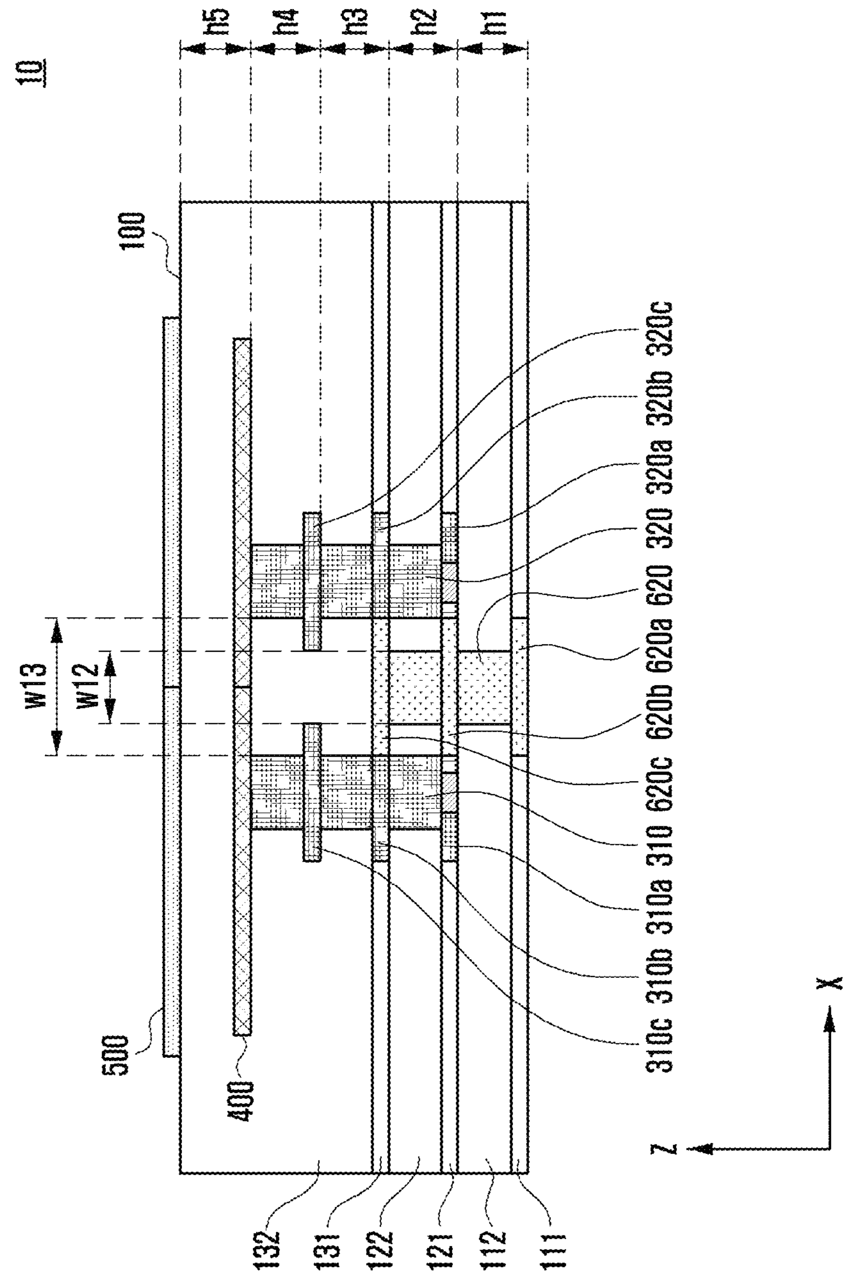
FIG. 8 is a cross-sectional view showing an antenna structure with reference to the y-z axis according to an embodiment of the disclosure.

FIG. 8 is a cross-sectional view showing an antenna structure with reference to the x-z axis according to an embodiment of the disclosure.

Referring to FIGS. 7 and 8, the multi-layer PCB 100 may include a first layer to a sixth layer. For example, the first layer of the multi-layer PCB 100 may correspond to the second antenna patch 500. The second layer of the multi-layer PCB 100 may correspond to the first antenna patch 400. The third layer of the multi-layer PCB 100 may correspond to at least one of the (1c)th via pad 310*c* and the (2c)th via pad 320*c*. The fourth layer of the multi-layer PCB 100 may correspond to the third substrate 131. The fifth layer of the multi-layer PCB 100 may correspond to the second substrate 121. The sixth layer of the multi-layer PCB 100 may correspond to the first substrate 111.

The first via 310 may extend from the second substrate 121 to the first antenna patch 400. The (1a)th via pad 310*a* may be disposed in the (2a)th groove 121*a* of the second substrate 121. The (1b)th via pad 310*b* may be disposed in (3a)th groove 131*a* of third substrate 131. The (1b)th via pad 310*b* may be spaced apart by the predetermined height h2 in the z-axis direction from the (1a)th via pad 310*a*. For example, the predetermined height h2 may be determined based on at least one of an operation frequency of the antenna structure 10 and a minimum limitation in the process at the time of manufacturing thereof. For example, in case that an operation frequency of the antenna structure 10 is 140 GHz, the predetermined height h2 may be approximately 50 μm. The (1c)th via pad 310*c* may be arranged to be spaced apart by the predetermined height h3 in the z-axis direction from the (1b)th via pad 310*b*. For example, the predetermined height h3 may be determined based on at least one of an operation frequency of the antenna structure 10 and a minimum limitation in the process at the time of manufacturing thereof. For example, in case that an operation frequency of the antenna structure 10 is 140 GHz, the predetermined height h3 may be approximately 50 μm. The (1d)th via pad 310*d* may be arranged to be spaced apart by the predetermined height h4 in the z-axis direction from the (1c)th via pad 310*c*. For example, the predetermined height h4 may be determined based on at least one of an operation frequency of the antenna structure 10 and a minimum limitation in the process at the time of manufacturing thereof. For example, in case that an operation frequency of the antenna structure 10 is 140 GHz, the predetermined height h4 may be approximately 50 μm.

The second via 320 may extend from the second substrate 121 to the first antenna patch 400. The (2a)th via pad 320*a* may be disposed in the (2b)th groove 121*b* of the second substrate 121. The (2b)th via pad 320*b* may be disposed in the (3b)th groove 131*b* of the third substrate 131. The (2b)th via pad 320*b* may be spaced apart by the predetermined height h2 in the z-axis direction from the (2a)th via pad 320*a*. The (2c)th via pad 320*c* may be arranged to be spaced apart by the predetermined height h3 in the z-axis direction from the (2b)th via pad 320*b*. The (2d)th via pad 320*d* may be arranged to be spaced apart by the predetermined height h4 in the z-axis direction from the (2c)th via pad 320*c*.

The ground via includes a first ground via 610, a second ground via 620, a (1a)th ground pad 610*a*, a (1b)th ground pad 610*b*, a (1c)th ground pad 610*c*, a (2a)th ground pad 620*a*, a (2b)th ground pad 620*b*, and a (2c)th ground pad 620*c*.

The first ground via 610 may extend through the first substrate 111, the second substrate 121, and the third substrate 131. For example, one end of the first ground via 610 may be physically connected to the first substrate 111. The other end of the first ground via 610 may be physically connected to the third substrate 131.

The (1a)th ground pad 610*a* may be disposed on the first step of the first ground via 610. The first step of the first ground via 610 may correspond to the first substrate 111. The (1a)th ground pad 610*a* may be disposed on the first substrate 111.

The (1b)th ground pad 610*b* may be disposed on the second step of the first ground via 610. The second step of the first ground via 610 may correspond to the second substrate 121. The (1b)th ground pad 610*b* may be disposed on the second substrate 121.

The (1c)th ground pad 610*c* may be disposed on the third step of the first ground via 610. The third step of the first ground via 610 may correspond to the third substrate 131. The (1c)th ground pad 610*c* may be disposed on the third substrate 131.

The second ground via 620 may extend through the first substrate 111, the second substrate 121, and the third substrate 131. For example, one end of the second ground via 620 may be physically connected to the first substrate 111. The other end of the second ground via 620 may be physically connected to the third substrate 131.

The (2a)th ground pad 620*a* may be disposed on the first step of the second ground via 620. The first step of the second ground via 620 may correspond to the first substrate 111. The (2a)th ground pad 620*a* may be disposed on the first substrate 111.

The (2b) the ground pad 620*b* may be disposed on the second step of the second ground via 620. The second step of the second ground via 620 may correspond to the second substrate 121. The (2b)th ground pad 620*b* may be disposed on the second substrate 121.

The (2c) the ground pad 620*c* may be disposed on the third step of the second ground via 620. The third step of the second ground via 620 may correspond to the third substrate 131. The (2c)th ground pad 620*c* may be disposed on the third substrate 131.

The thickness of each of the first antenna patch 400, the second antenna patch 500, the first substrate 111, the second substrate 121, the third substrate 131, the first dielectric layer 112, the second dielectric layer 122, the (1c)th via pad 310*c*, and the (1d)th via pad 310*d*, that is, the height thereof with reference to the z-axis may be approximately 15 μm.

The (1a)th via pad 310*a* and the (2a)th via pad 320*a* may be spaced apart by a predetermined distance w12 from each other in the x-axis direction. For example, the predetermined distance w12 may be determined based on at least one of an operation frequency of the antenna structure 10 and a minimum limitation in the process at the time of manufacturing thereof. For example, in case that an operation frequency of the antenna structure 10 is 140 GHz, the predetermined distance w12 may be approximately 70 μm.

The first via 310 and the second via 320 may be spaced apart by a predetermined distance w13 from each other in the x-axis direction. For example, the predetermined distance w13 may be determined based on at least one of an operation frequency of the antenna structure 10 and a minimum limitation in the process at the time of manufacturing thereof. For example, in case that an operation frequency of the antenna structure 10 is 140 GHz, the predetermined distance w13 may be approximately 130 μm.

Figure 9:
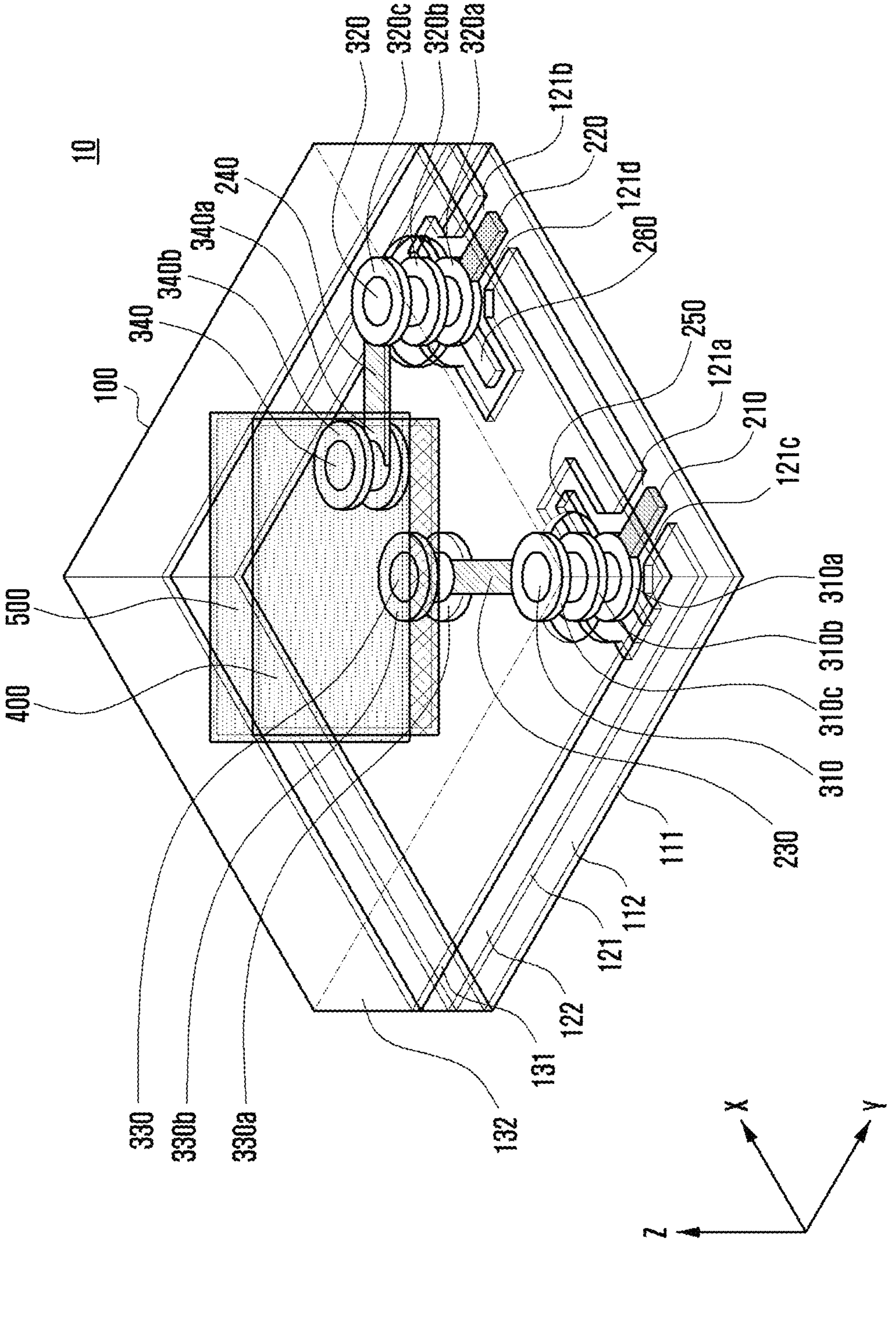
FIG. 9 is a perspective view showing an antenna structure according to an embodiment of the disclosure.

FIG. 9 is a perspective view showing an antenna structure according to an embodiment of the disclosure.

Referring to FIG. 9, the antenna structure 10 may include a multi-layer PCB 100, a first feed line 210, a second feed line 220, a third feed line 230, a fourth feed line 240, a first impedance matching structure 250, a second impedance matching structure 260, a first via 310, a second via 320, a third via 330, a fourth via 340, a (1a)th via pad 310*a*, a (1b)th via pad 310*b*, a (1c)th via pad 310*c*, a (2a)th via pad 320*a*, a (2b)th via pad 320*b*, a (3a)th via pad 330*a*, a (3b)th via pad 330*b*, a (3c)th via pad 330*c*, a (4a)th via pad 340*a*, a (4b)th via pad 340*b*, a first antenna patch 400, and a second antenna patch 500.

The first feed line 210 may be disposed in the (2a)th groove 121*a* of the second substrate 121. One end of the first feed line 210 may be referred to as a first port. One end of the first feed line 210 may be electrically connected to a separate first port (not shown).

The other end of the first feed line 210 may be electrically connected to the (1a)th via pad 310*a*. The other end of the first feed line 210 may be electrically connected to one end of the first via 310 in the (2c)th groove 121*c* of the second substrate 121.

The first via 310 may be physically coupled to the (1a)th via pad 310*a*, the (1b)th via pad 310*b*, and the (1c)th via pad 310*c*. For example, the first via 310 may be divided into a first step to a third step with reference to the z-axis. For example, the (1a)th via pad 310*a* may be physically coupled to the first step of the first via 310. The (1b)th via pad 310*b* may be physically coupled to the second step of the first via 310. The (1c)th via pad 310*c* may be physically coupled to the third step of the first via 310.

The (1a)th via pad 310*a* may be disposed in the (2c)th groove 121*c* of the second substrate 121. The (1b)th via pad 310*b* may be disposed in the (3c)th groove 131*c* of the third substrate 131. The (1c)th via pad 310*c* may be electrically connected to one end of the third feed line 230.

The first impedance matching structure 250 may have a line shape extending from each of one side and the other side of the (1a)th via pad 310*a* in the (2c)th groove 121*c* of the second substrate 121.

One end of the second feed line 220 may be electrically connected to the (1c)th via pad 310*c*. The other end of the second feed line 220 may be electrically connected to the (2a)th via pad 320*a*.

The second via 320 may include the (2a)th via pad 320*a* and the (2b)th via pad 320*b*. For example, the second via 320 may be divided into a first step and a second step with reference to the z-axis. For example, the (2a)th via pad 320*a* may be physically coupled to the first step of the second via 320. The (2b)th via pad 320*b* may be physically coupled to the second step of the second via 320. The (2b)th via pad 320*b* may be physically coupled to the first antenna patch 400. The first antenna patch 400 may include the (2b)th via pad 320*b*.

The second feed line 220 may be disposed in a (2b)th groove 121*b* of the second substrate 121. One end of the second feed line 220 may be referred to as a second port. One end of the second feed line 220 may be electrically connected to a separate second port (not shown).

The other end of the third feed line 230 may be electrically connected to the (3a)th via pad 330*a*. The other end of the third feed line 230 may be electrically connected to one end of the third via 330 in the (2c)th groove 121*c* of the second substrate 121.

The third via 330 may be physically coupled to the (3a)th via pad 330*a*, the (3b)th via pad 330*b*, and the (3c)th via pad 330*c*. For example, the third via 330 may be divided into a first step to a third step with reference to the z-axis. For example, the (3a)th via pad 330*a* may be physically coupled to the first step of the third via 330. The (3b)th via pad 330*b* may be physically coupled to the second step of the third via 330. The (3c)th via pad 330*c* may be physically coupled to the third step of the third via 330.

One end of the fourth feed line 240 may be electrically connected to the (3c)th via pad 330*c*. The other end of the fourth feed line 240 may be electrically connected to the (4a)th via pad 340*a*.

The fourth via 340 may include the (4a)th via pad 340*a* and the (4b)th via pad 340*b*. For example, the fourth via 340 may be divided into a first step and a second step with reference to the z-axis. For example, the (4a)th via pad 340*a* may be physically coupled to the first step of the fourth via 340. The (4b)th via pad 340*b* may be physically coupled to the second step of the fourth via 340. The (4b)th via pad 340*b* may be physically coupled to the first antenna patch 400. The first antenna patch 400 may include the (4b)th via pad 340*b*. The fourth via 340 may be referred to as a second probe feed.

Figure 10:
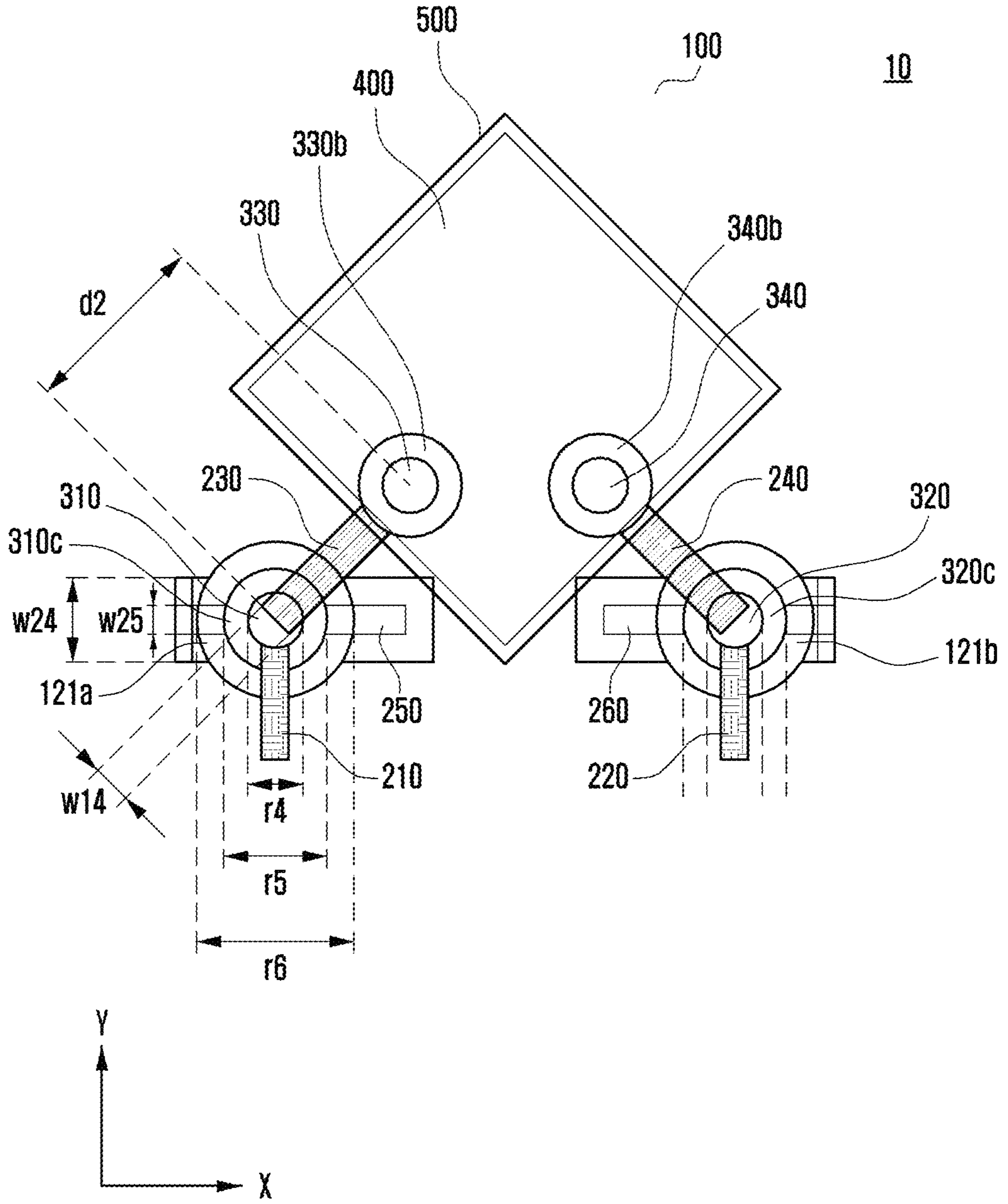
FIG. 10 is a plan view showing an antenna structure with reference to the x-y axis according to an embodiment of the disclosure.

FIG. 10 is a plan view showing an antenna structure with reference to the x-y axis according to an embodiment of the disclosure.

Referring to FIG. 10, the (1a)th via pad 310*a*, the (1b)th via pad 310*b*, and the (1c)th via pad 310*c* may be arranged to overlap each other with reference to the z-axis. The (2a)th via pad 320*a* and the (2b)th via pad 320*b* may be arranged to overlap each other with reference to the z-axis.

For example, the diameter r4 of the first via 310, the diameter r5 of the (1c)th via pad 310*c*, and the diameter r6 of the (2a)th groove 121*a* may be determined based on at least one of an operation frequency of the antenna structure 10 and a minimum limitation in the process at the time of manufacturing thereof. For example, in case that an operation frequency of the antenna structure 10 is 140 GHz, the diameter r4 of the first via 310 may be approximately 40 μm to 70 μm. The diameter r5 of the (1c)th via pad 310*c* may be approximately 120 μm to 130 μm. The diameter (r6) of the (2a)th groove 121*a* may be approximately 210 μm.

The third feed line 230 may extend from the (1c)th via pad 310*c* toward the (2a)th via pad 320*a*. For example, the horizontal length w14 of the third feed line 230 may be determined based on at least one of an operation frequency of the antenna structure 10 and a minimum limitation in the process at the time of manufacturing thereof. For example, in case that an operation frequency of the antenna structure 10 is 140 GHz, the horizontal length w14 of the third feed line 230 may be approximately 50 μm. The vertical length d2 of the third feed line 230 may be determined based on at least one of an operation frequency of the antenna structure 10 and a minimum limitation in the process at the time of manufacturing thereof. For example, in case that an operation frequency of the antenna structure 10 is 140 GHz, the horizontal length w14 of the third feed line 230 may be approximately 235 μm. The horizontal length w14 of the third feed line 230 may be equal to or similar to the length from the center of the first via 310 to the center of the third via 330 on the x-y plane.

The (3a)th via pad 330*a*, the (3b)th via pad 330*b*, and the (3c)th via pad 330*c* may be arranged to overlap each other with reference to the z-axis. The (4a)th via pad 340*a* and the (4b)th via pad 340*b* may be arranged to overlap each other with reference to the z-axis.

The fourth feed line 240 may extend from the (3c)th via pad 330*c* toward the (4a)th via pad 340*a*. For example, the horizontal length of the fourth feed line 240 may be equal to or similar to the horizontal length w14 of the third feed line 230. The vertical length of the fourth feed line 240 may be equal to or similar to the vertical length d2 of the third feed line 230.

The (1a)th via pad 310*a* and the (3a)th via pad 330*a* may be spaced apart by a predetermined distance from each other in the x-axis direction with reference to the x-y plane. For example, the predetermined distance may be equal to or similar to the vertical length d2 of the third feed line 230.

The (1b)th via pad 310*b* and the (3b)th via pad 330*b* may be spaced apart by a predetermined distance from each other in the x-axis direction with reference to the x-y plane. For example, the predetermined distance may be equal to or similar to the vertical length of the fourth feed line 240.

The first impedance matching structure 250 may have a structure extending from one side and the other side of the (1a)th via pad 310*a* with reference to the x-y plane. For example, the first impedance matching structure 250 may be disposed substantially perpendicular to the first feed line 210 with reference to the x-y plane. For example, the width w25 of the first impedance matching structure 250 may be determined based on at least one of an operation frequency of the antenna structure 10 and a minimum limitation in the process at the time of manufacturing thereof. For example, in case that an operation frequency of the antenna structure 10 is 140 GHz, the width w25 of the first impedance matching structure 250 may be approximately 40 μm. The horizontal length of the first impedance matching structure 250 with reference to the x-y plane may have various values. For example, the impedance matching performance of the antenna structure 10 may vary according to the horizontal length of the first impedance matching structure 250 with reference the x-y plane.

The second impedance matching structure 260 may have a structure extending from one side and the other side of the (2a)th via pad 320*a* with reference to the x-y plane. For example, the second impedance matching structure 260 may be disposed substantially perpendicular to the second feed line 220 with reference to the x-y plane. For example, the width of the second impedance matching structure 260 may be equal to or similar to the width w24 of the first impedance matching structure 250.

Figure 11:
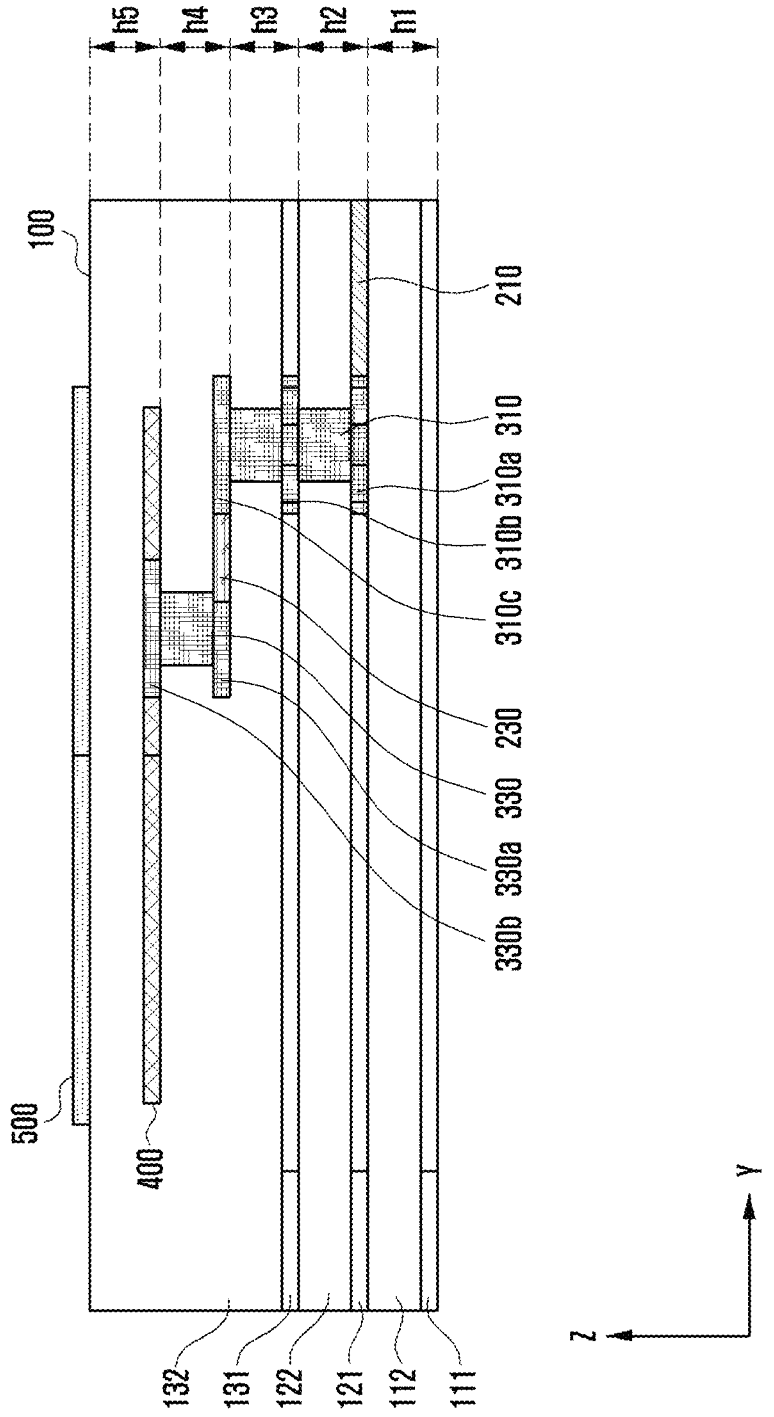
FIG. 11 is a cross-sectional view showing an antenna structure with reference to the y-z axis according to an embodiment of the disclosure.

FIG. 11 is a cross-sectional view showing an antenna structure with reference to the y-z axis according to an embodiment of the disclosure.

Figure 12:
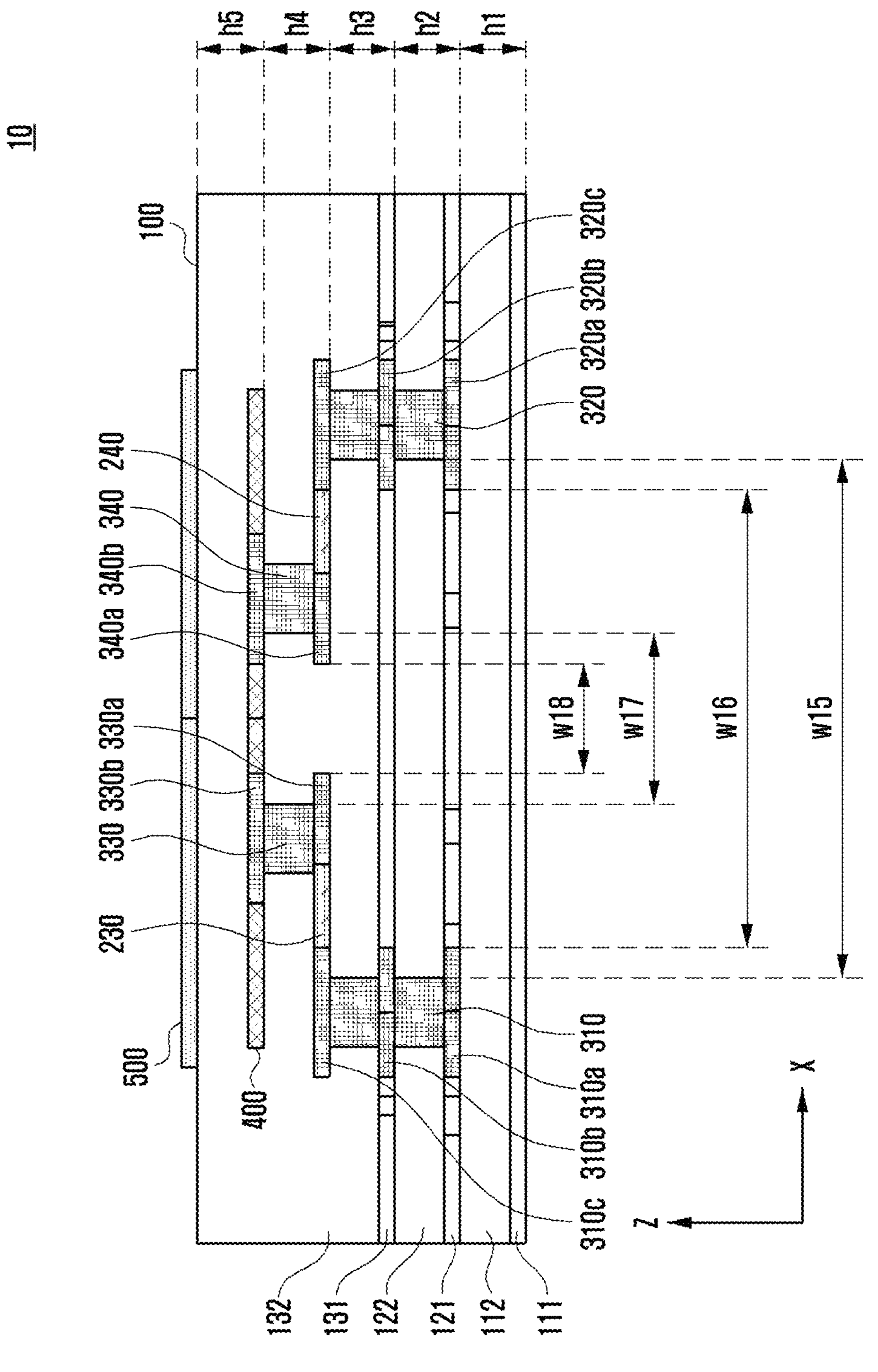
FIG. 12 is a cross-sectional view showing an antenna structure with reference to the x-z axis according to an embodiment of the disclosure.

FIG. 12 is a cross-sectional view showing an antenna structure with reference to the x-z axis according to an embodiment of the disclosure.

Referring to FIGS. 11 and 12, the multi-layer PCB 100 may include a first layer to a sixth layer. For example, the first layer of the multi-layer PCB 100 may correspond to the second antenna patch 500. The second layer of the multi-layer PCB 100 may correspond to the first antenna patch 400. The third layer of the multi-layer PCB 100 may correspond to at least one of the (3a)th via pad 330*a* and the (4a)th via pad 340*a*. The fourth layer of the multi-layer PCB 100 may correspond to the third substrate 131. The fifth layer of the multi-layer PCB 100 may correspond to the second substrate 121. The sixth layer of the multi-layer PCB 100 may correspond to the first substrate 111.

The first via 310 may extend from the second substrate 121 to one end of the third feed line 230 in the z-axis direction. The (1b)th via pad 310*b* may be spaced apart by the predetermined height h2 in the z-axis direction from the (1a)th via pad 310*a*. For example, the predetermined height h2 may be determined based on at least one of an operation frequency of the antenna structure 10 and a minimum limitation in the process at the time of manufacturing thereof. For example, in case that an operation frequency of the antenna structure 10 is 140 GHz, the predetermined height h2 may be approximately 50 μm. The (1c)th via pad 310*c* may be arranged to be spaced apart by the predetermined height h3 in the z-axis direction from the (1b)th via pad 310*b*. For example, the predetermined height h3 may be determined based on at least one of an operation frequency of the antenna structure 10 and a minimum limitation in the process at the time of manufacturing thereof. For example, in case that an operation frequency of the antenna structure 10 is 140 GHz, the predetermined height h3 may be approximately 50 μm.

The third feed line 230 may electrically connect the (1c)th via pad 310*c* and the (2a)th via pad 320*a*.

The third via 330 may extend from the other end of the third feed line 230 to the first antenna patch 400. The (3a)th via pad 330*a* may be disposed at one end of the third via 330. The (3b)th via pad 330*b* may be disposed to be spaced apart by the predetermined height h4 in the z-axis direction from the (3a)th via pad 330*a*. For example, the predetermined height h4 may be determined based on at least one of an operation frequency of the antenna structure 10 and a minimum limitation in the process at the time of manufacturing thereof. For example, in case that an operation frequency of the antenna structure 10 is 140 GHz, the predetermined height h4 may be approximately 50 μm.

The second via 320 may extend from the second substrate 121 to one end of the fourth feed line 240 in the z-axis direction. The (3b)th via pad 330*b* may be spaced apart by the predetermined height h2 in the z-axis direction from the (3a)th via pad 330*a*. The (3c)th via pad 330*c* may be arranged to be spaced apart by the predetermined height h3 in the z-axis direction from the (3b)th via pad 330*b*.

The fourth feed line 240 may electrically connect the (3c)th via pad 330*c* and the (4a)th via pad 340*a*.

The second via 320 may extend from the other end of the fourth feed line 240 to the first antenna patch 400. The (4a)th via pad 340*a* may be disposed at one end of the fourth via 340. The (4b)th via pad 340*b* may be disposed to be spaced apart by the predetermined height h4 in the z-axis direction from the (4a)th via pad 340*a*.

The first via 310 and the second via 320 may be spaced apart by a predetermined distance w15 from each other in the x-axis direction. For example, the predetermined distance w15 may be determined based on at least one of an operation frequency of the antenna structure 10 and a minimum limitation in the process at the time of manufacturing thereof. For example, in case that an operation frequency of the antenna structure 10 is 140 GHz, the predetermined distance w15 may be approximately 502 μm.

The (1a)th via pad 310*a* and the (2a)th via pad 320*a* may be spaced apart by a predetermined distance w16 from each other in the x-axis direction. For example, the predetermined distance w16 may be determined based on at least one of an operation frequency of the antenna structure 10 and a minimum limitation in the process at the time of manufacturing thereof. For example, in case that an operation frequency of the antenna structure 10 is 140 GHz, the predetermined distance w15 may be approximately 442 μm.

The third via 330 and the fourth via 340 may be spaced apart by a predetermined distance w17 from each other in the x-axis direction. For example, the predetermined distance w17 may be determined based on at least one of an operation frequency of the antenna structure 10 and a minimum limitation in the process at the time of manufacturing thereof. For example, in case that an operation frequency of the antenna structure 10 is 140 GHz, the predetermined distance w15 may be approximately 130 μm.

The (3a)th via pad 330*a* and the (4a)th via pad 320*a* may be spaced apart by a predetermined distance w18 from each other in the x-axis direction. For example, the predetermined distance w18 may be determined based on at least one of an operation frequency of the antenna structure 10 and a minimum limitation in the process at the time of manufacturing thereof. For example, in case that an operation frequency of the antenna structure 10 is 140 GHz, the predetermined distance w15 may be approximately 110 μm.

Figure 13:
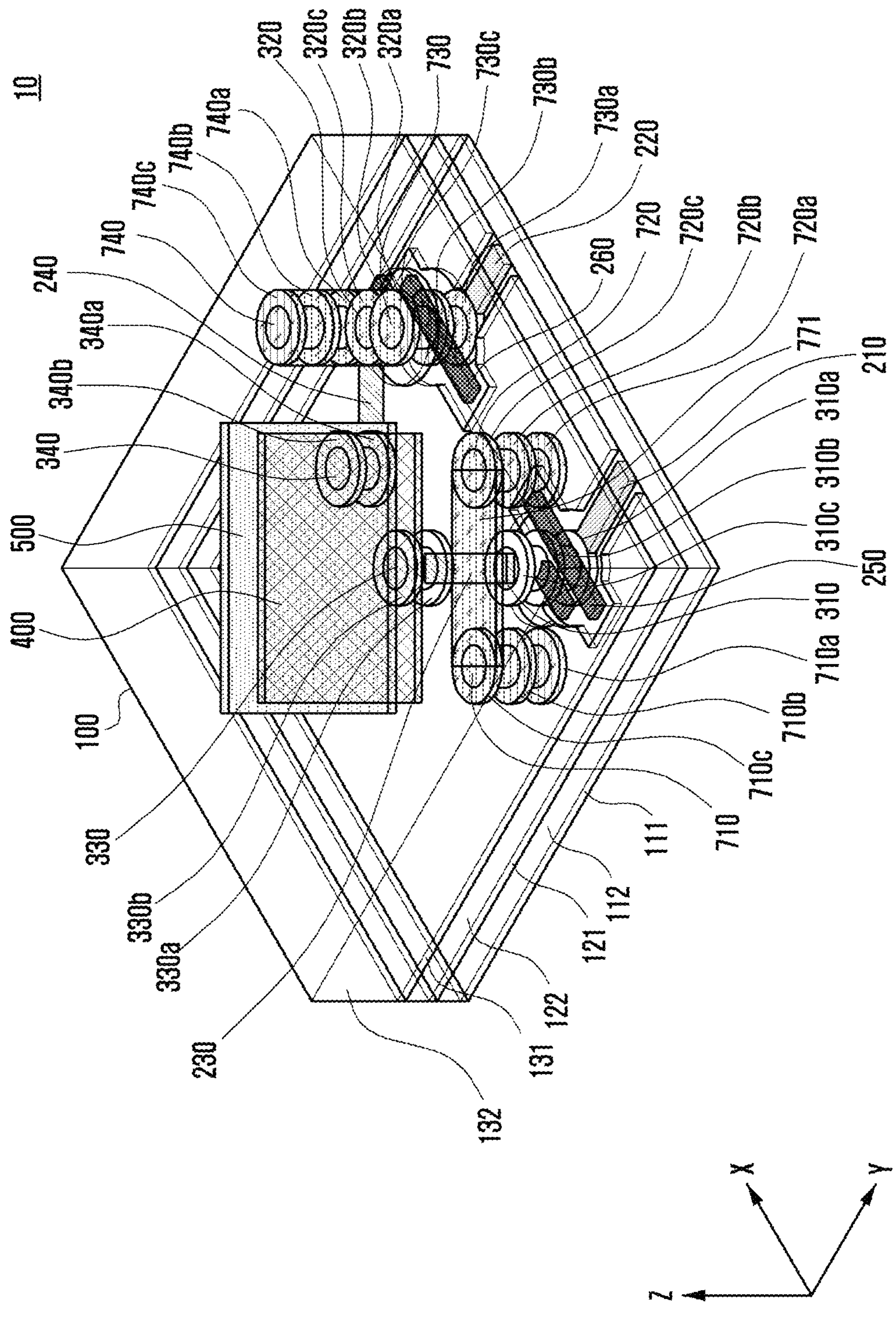
FIG. 13 is a perspective view showing an antenna structure including a first shielding structure and a second shielding structure according to an embodiment of the disclosure.

FIG. 13 is a perspective view showing an antenna structure including a first shielding structure and a second shielding structure according to an embodiment of the disclosure.

Referring to FIG. 13, identically to the antenna structure 10 in FIGS. 9 to 12, the antenna structure 10 may include a multi-layer PCB 100, a first feed line 210, a second feed line 220, a third feed line 230, a fourth feed line 240, a first impedance matching structure 250, a second impedance matching structure 260, a first via 310, a second via 320, a third via 330, a fourth via 340, a (1a)th via pad 310*a*, a (1b)th via pad 310*b*, a (1c)th via pad 310*c*, a (2a)th via pad 320*a*, a (2b)th via pad 320*b*, a (3a)th via pad 330*a*, a (3b)th via pad 330*b*, a (3c)th via pad 330*c*, a (4a)th via pad 340*a*, a (4b)th via pad 340*b*, a first antenna patch 400, and a second antenna patch 500.

The antenna structure 10 may include a first shielding structure and a second shielding structure. For example, the first shielding structure may be disposed to surround a part of each of the first via 310, the (1b)th via pad 310*b*, the (1c)th via pad 310*c*, and the second feed line 220. The second shielding structure may be disposed to surround a part of each of the third via 330, the (3b)th via pad 330*b*, the (3c)th via pad 330*c*, and the fourth feed line 240.

The first shielding structure may include a first shielding via 710, a second shielding via 720, a (1a)th shielding pad 710*a*, a (1b)th shielding pad 710*b*, a (1c)th shielding pad 710*c, a*(2a)th shielding pad 720*a*, a (2b)th shielding pad 720*b*, a (2c)th shielding pad 720*c*, and a first shielding cover 771. The second shielding structure may include a third shielding via 730, a fourth shielding via 740, a (3a)th shielding pad 730*a*, a (3b)th shielding pad 730*b*, a (3c)th shielding pad 730*c*, a (4a)th shielding pad 740*a*, a (4b)th shielding pad 740*b*, a (4c)th shielding pad 740*c*, and a second shielding cover 772.

Figure 14:
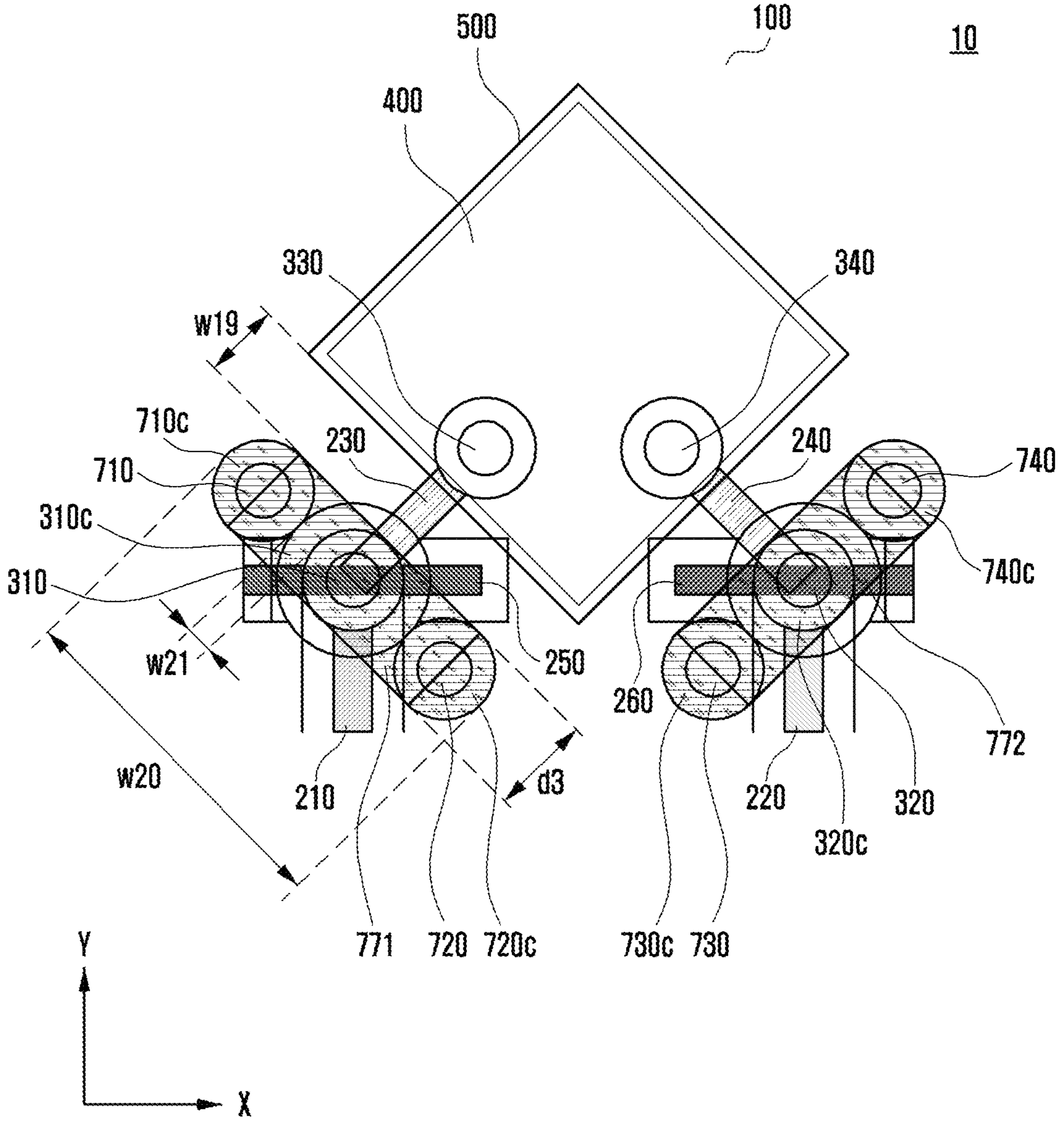
FIG. 14 is a plan view showing an antenna structure with reference to the x-y axis according to an embodiment of the disclosure.

FIG. 14 is a plan view showing an antenna structure with reference to the x-y axis according to an embodiment of the disclosure.

Referring to FIG. 14, the first shielding structure and the second shielding structure may be arranged to face each other on the x-y plane.

The first shielding structure may be disposed substantially parallel to a first side surface of the first antenna patch 400. The first shielding cover 771 may be disposed substantially parallel to the first side surface of the first antenna patch 400. The first shielding structure may be spaced apart by a predetermined distance w19 from the first side surface of the first antenna patch 400. The first shielding cover 771 may be spaced apart by the predetermined distance w19 from the first side surface of the first antenna patch 400. For example, the predetermined distance w19 may be determined based on at least one of an operation frequency of the antenna structure 10 and a minimum limitation in the process at the time of manufacturing thereof. For example, in case that an operation frequency of the antenna structure 10 is 140 GHz, the predetermined distance w19 may be approximately 105 μm.

The center of the first shielding cover 771 may substantially coincide with the center of the first via 310 on the z-axis. One end of the first shielding cover 771 may be physically coupled to the (1c)th shielding pad 710*c*. The other end of the first shielding cover 771 may be physically coupled to the (2c)th shielding pad 720*c*. A horizontal length w20 of the first shielding cover 771 may be determined based on at least one of an operation frequency of the antenna structure 10 and a minimum limitation in the process at the time of manufacturing thereof. For example, in case that an operation frequency of the antenna structure 10 is 140 GHz, the predetermined distance w20 may be approximately 470 μm. A vertical length d3 of the first shielding cover 771 may be determined based on at least one of an operation frequency of the antenna structure 10 and a minimum limitation in the process at the time of manufacturing thereof. For example, in case that an operation frequency of the antenna structure 10 is 140 GHz, the vertical length d3 of the first shielding cover 771 may be approximately 130 μm.

The (1c)th shielding pad 710*c* may be spaced apart by a predetermined distance w21 from (1c)th via pad 310*c* on the x-y plane. For example, the predetermined distance w21 may be determined based on at least one of an operation frequency of the antenna structure 10 and a minimum limitation in the process at the time of manufacturing thereof. For example, in case that an operation frequency of the antenna structure 10 is 140 GHz, the predetermined distance w21 may be approximately 40 μm. The (1a)th shielding pad 710*a*, the (1b)th shielding pad 710*b*, and the (1c)th shielding pad 710*c* may be arranged to overlap each other on the z-axis.

The (2c)th shielding pad 720*c* may be spaced apart by a predetermined distance w19 from (1c)th via pad 310*c* on the x-y plane. The (2c)th shielding pad 720*c* may be disposed to face the (1c)th via pad 710*c* with reference to the (1c)th via pad 310*c*. The (2a)th shielding pad 720*a*, the (2b)th shielding pad 720*b*, and the (2c)th shielding pad 720*c* may be arranged to overlap each other on the z-axis.

The second shielding structure may be disposed substantially parallel to a second side surface of the first antenna patch 400. The second shielding cover 772 may be disposed substantially parallel to the second side surface of the first antenna patch 400. The second shielding structure may be spaced apart by a predetermined distance from the second side surface of the first antenna patch 400. For example, the spaced distance between the second shielding structure and the second side surface of the first antenna patch 400 may be equal to as or similar to the spaced distance w19 between the first shielding structure and the first side surface of the first antenna patch 400.

The center of the second shielding cover 772 may substantially coincide with the center of the third via 330 on the z-axis. One end of the second shielding cover 772 may be physically coupled to the (3c)th shielding pad 730*c*. The other end of the second shielding cover 772 may be physically coupled to the (3c)th shielding pad 730*c*. For example, the horizontal length of the second shielding cover 772 may be equal to as or similar to the horizontal length w20 of the first shielding cover 771. The vertical length of the second shielding cover 772 may be equal to as or similar to the vertical length d3 of the first shielding cover 771.

The (3c)th shielding pad 730*c* may be spaced apart by a predetermined distance w21 from (3c)th via pad 330*c* on the x-y plane. The (3a)th shielding pad 730*a*, the (3b)th shielding pad 730*b*, and the (3c)th shielding pad 730*c* may be arranged to overlap each other on the z-axis.

The (4c)th shielding pad 740*c* may be spaced apart by a predetermined distance w21 from (3c)th via pad 330*c* on the x-y plane. The (4c)th shielding pad 740*c* may be disposed to face the (3c)th via pad 730*c* with reference to the (3c)th via pad 330*c*. The (4a)th shielding pad 740*a*, the (4b)th shielding pad 740*b*, and the (4c)th shielding pad 740*c* may be arranged to overlap each other on the z-axis.

Figure 15:
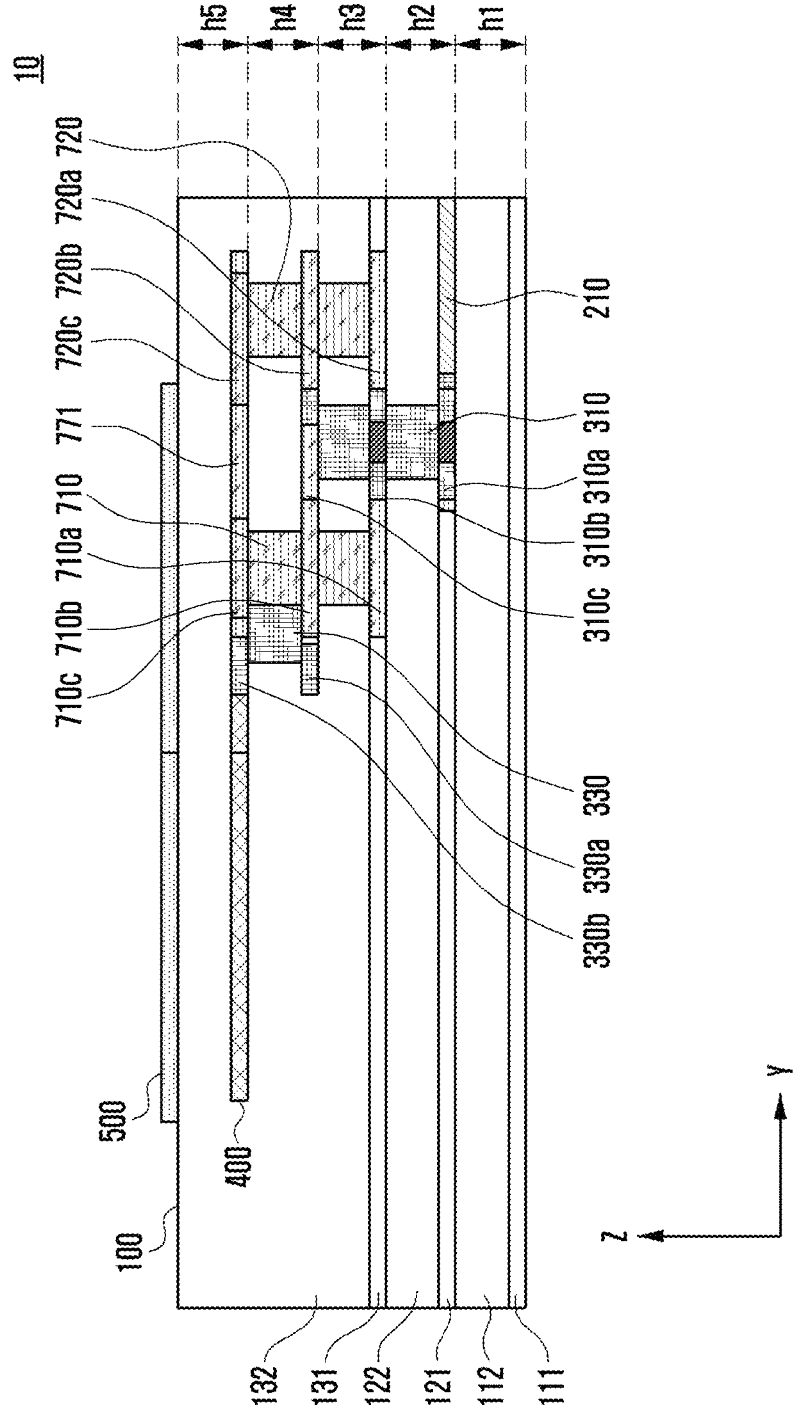
FIG. 15 is a cross-sectional view showing an antenna structure with reference to the y-z axis according to an embodiment of the disclosure.

FIG. 15 is a cross-sectional view showing an antenna structure with reference to the y-z axis according to an embodiment of the disclosure.

Figure 16:
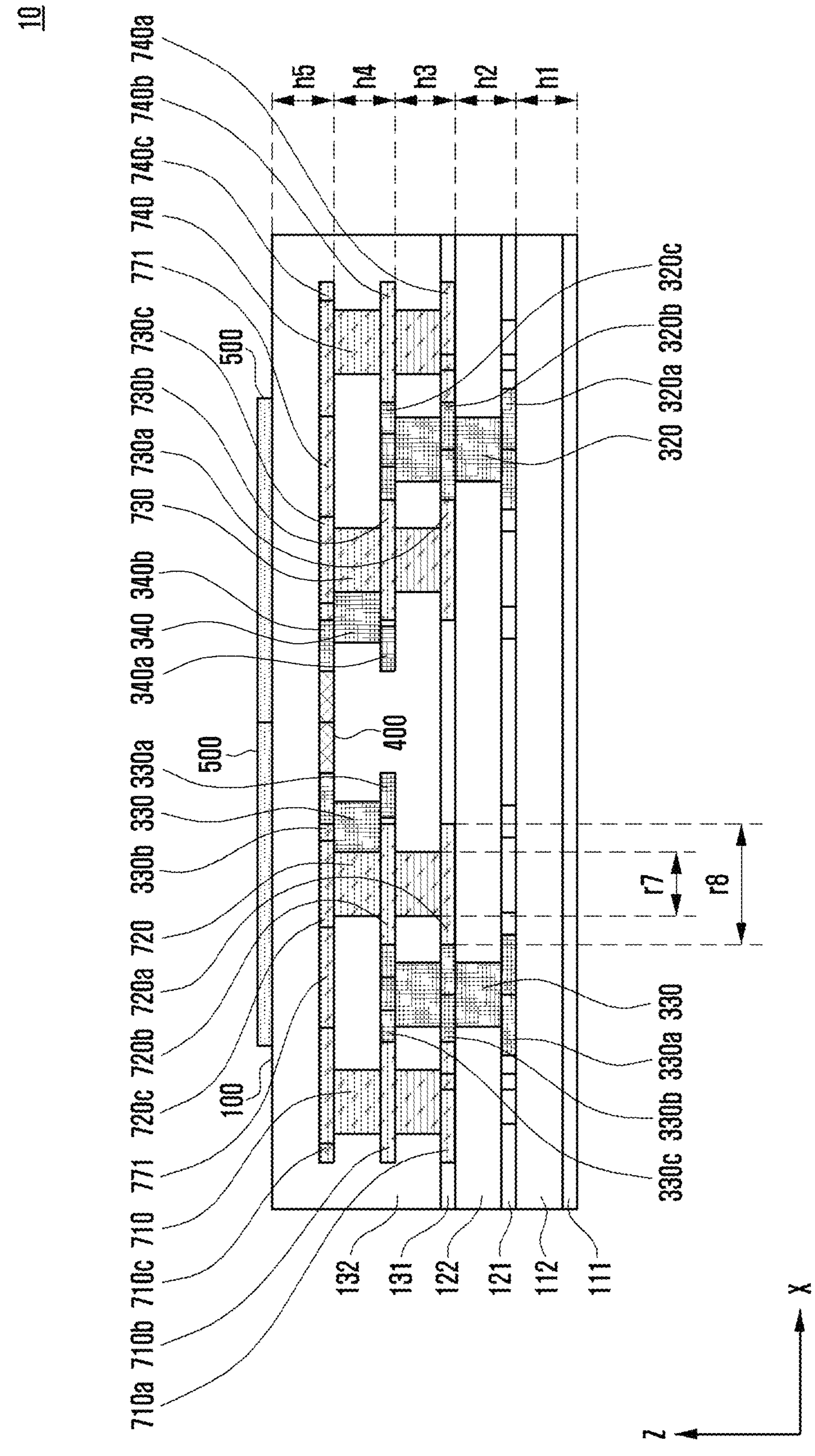
FIG. 16 is a cross-sectional view showing an antenna structure with reference to the x-z axis according to an embodiment of the disclosure.

FIG. 16 is a cross-sectional view showing an antenna structure with reference to the x-z axis according to an embodiment of the disclosure.

Referring to FIGS. 15 and 16, the multi-layer PCB 100 may include a first layer to a sixth layer. For example, the first layer of the multi-layer PCB 100 may correspond to the second antenna patch 500. The second layer of the multi-layer PCB 100 may correspond to at least one of the first antenna patch 400, the first shielding cover 771, and the second shielding cover 772. The third layer of the multi-layer PCB 100 may correspond to at least one of a (3a)th via pad 330*a*, a (4a)th via pad 340*a*, a (1b)th shielding pad 710*b*, a (2b)th shielding pad 720*b*, a (3b)th shielding pad 730*b*, and a (4b)th shielding pad 740*b*. The fourth layer of the multi-layer PCB 100 may correspond to the third substrate 131. The fifth layer of the multi-layer PCB 100 may correspond to the second substrate 121. The sixth layer of the multi-layer PCB 100 may correspond to the first substrate 111.

One end of the first shielding via 710 may be physically connected to the (1a)th shielding pad 710*a*. The other end of the first shielding via 710 may be physically connected to the (1c)th shielding pad 710*c*.

The (1a)th shielding pad 710*a* may be disposed on the third substrate 131. The (1a)th shielding pad 710*a* may be disposed on the first step of the first shielding via 710. The (1a)th shielding pad 710*a* may be disposed adjacent to the (1b)th via pad 310*b* in the third substrate 131. The diameter r7 of the first shielding via 710 may be determined based on at least one of an operation frequency of the antenna structure 10 and a minimum limitation in the process at the time of manufacturing thereof. For example, in case that an operation frequency of the antenna structure 10 is 140 GHz, the diameter r7 of the first shielding via 710 may be approximately 70 μm. For example, the diameter r8 of the (1a)th shielding pad 710*a* may be determined based on at least one of an operation frequency of the antenna structure 10 and a minimum limitation in the process at the time of manufacturing thereof. For example, in case that an operation frequency of the antenna structure 10 is 140 GHz, the diameter r8 of the (1a)th shielding pad 710*a* may be approximately 130 μm.

The (1b)th shielding pad 710*b* may be disposed on the second step of the first shielding via 710. The (1b)th shielding pad 710*b* may be spaced apart by the predetermined height h3 from the (1a)th shielding pad 710*a*. The (1b)th shielding pad 710*b* may be adjacently disposed at a height substantially the same as the (1c)th via pad 310*c*. The diameter of the (1b)th shielding pad 710*b* may be equal to or similar to the diameter r8 of the (1a)th shielding pad 710*a*.

The (1c)th shielding pad 710*c* may be disposed on the third step of the first shielding via 710. The (1c)th shielding pad 710*c* may be spaced apart by the predetermined height h4 from the (1b)th shielding pad 710*b*. The diameter of the (1c)th shielding pad 710*c* may be equal to or similar to the diameter r8 of the (1a)th shielding pad 710*a*.

One end of the second shielding via 720 may be physically connected to the (2a)th shielding pad 720*a*. The other end of the second shielding via 720 may be physically connected to the (2c)th shielding pad 720*c*.

The (2a)th shielding pad 720*a* may be disposed on the third substrate 131. The (2a)th shielding pad 720*a* may be disposed on the first step of the second shielding via 720. The (2a)th shielding pad 720*a* may be disposed adjacent to the (1b)th via pad 310*b* in the third substrate 131. The diameter of the second shielding via 720 may be equal to or similar to the diameter r7 of the first shielding via 710. The diameter of the (2a)th shielding pad 720*a* may be equal to or similar to the diameter r8 of the (1a)th shielding pad 710*a*.

The (2b)th shielding pad 720*b* may be disposed on the second step of the second shielding via 720. The (2b)th shielding pad 720*b* may be spaced apart by the predetermined height h3 from the (2a)th shielding pad 720*a*. The (2b)th shielding pad 720*b* may be adjacently disposed at a height substantially the same as the (1c)th via pad 310*c*. The diameter of the (2b)th shielding pad 720*b* may be equal to or similar to the diameter r8 of the (1a)th shielding pad 710*a*.

The (2c)th shielding pad 720*c* may be disposed on the third step of the second shielding via 720. The (2c)th shielding pad 720*c* may be spaced apart by the predetermined height h4 from the (2b)th shielding pad 720*b*. The diameter of the (2c)th shielding pad 720*c* may be equal to or similar to the diameter r8 of the (1a)th shielding pad 710*a*.

The first shielding cover 771 may be spaced apart by the predetermined height h4 from the (1c)th via pad 310*c*. The first shielding cover 771 may be disposed at a height substantially the same as the first antenna patch 400.

One end of the third shielding via 730 may be physically connected to the (3a)th shielding pad 730*a*. The other end of the third shielding via 730 may be physically connected to the (3c)th shielding pad 730*c*. The diameter of the third shielding via 730 may be equal to or similar to the diameter r7 of the first shielding via 710. The diameter of the (3a)th shielding pad 730*a* may be equal to or similar to the diameter r8 of the (1a)th shielding pad 710*a*.

The (3a)th shielding pad 730*a* may be disposed on the third substrate 131. The (3a)th shielding pad 730*a* may be disposed on the first step of the third shielding via 730. The (3a)th shielding pad 730*a* may be disposed adjacent to the (3b)th via pad 330*b* in the third substrate 131.

The (3b)th shielding pad 730*b* may be disposed on the second step of the third shielding via 730. The (3b)th shielding pad 730*b* may be spaced apart by the predetermined height h3 from the (3a)th shielding pad 730*a*. The (3b)th shielding pad 730*b* may be adjacently disposed at a height substantially the same as the (3c)th via pad 330*c*. The diameter of the (3b)th shielding pad 730*b* may be equal to or similar to the diameter r8 of the (1a)th shielding pad 710*a*.

The (3c)th shielding pad 730*c* may be disposed on the third step of the third shielding via 730. The (3c)th shielding pad 730*c* may be spaced apart by the predetermined height h4 from the (3b)th shielding pad 730*b*. The diameter of the (3c)th shielding pad 730*c* may be equal to or similar to the diameter r8 of the (1a)th shielding pad 710*a*.

One end of the fourth shielding via 740 may be physically connected to the (4a)th shielding pad 740*a*. The other end of the fourth shielding via 740 may be physically connected to the (4c)th shielding pad 740*c*. The diameter of the fourth shielding via 740 may be equal to or similar to the diameter r7 of the first shielding via 710. The diameter of the (4a)th shielding pad 740*a* may be equal to or similar to the diameter r8 of the (1a)th shielding pad 710*a*.

The (4a)th shielding pad 740*a* may be disposed on the third substrate 131. The (4a)th shielding pad 740*a* may be disposed on the first step of the fourth shielding via 740. The (4a)th shielding pad 740*a* may be disposed adjacent to the (3b)th via pad 330*b* in the third substrate 131.

The (4b)th shielding pad 740*b* may be disposed on the second step of the fourth shielding via 740. The (4b)th shielding pad 740*b* may be spaced apart by the predetermined height h3 from the (4a)th shielding pad 740*a*. The (4b)th shielding pad 740*b* may be adjacently disposed at a height substantially the same as the (3c)th via pad 330*c*. The diameter of the (4b)th shielding pad 740*b* may be equal to or similar to the diameter r8 of the (1a)th shielding pad 710*a*.

The (4c)th shielding pad 740*c* may be disposed on the third step of the fourth shielding via 740. The (4c)th shielding pad 740*c* may be spaced apart by the predetermined height h4 from the (4b)th shielding pad 740*b*. The diameter of the (4c)th shielding pad 740*c* may be equal to or similar to the diameter r8 of the (1a)th shielding pad 710*a*.

The second shielding cover 772 may be spaced apart by the predetermined height h4 from the (3c)th via pad 330*c*. The second shielding cover 772 may be disposed at a height substantially the same as the probe feed.

Figure 17:
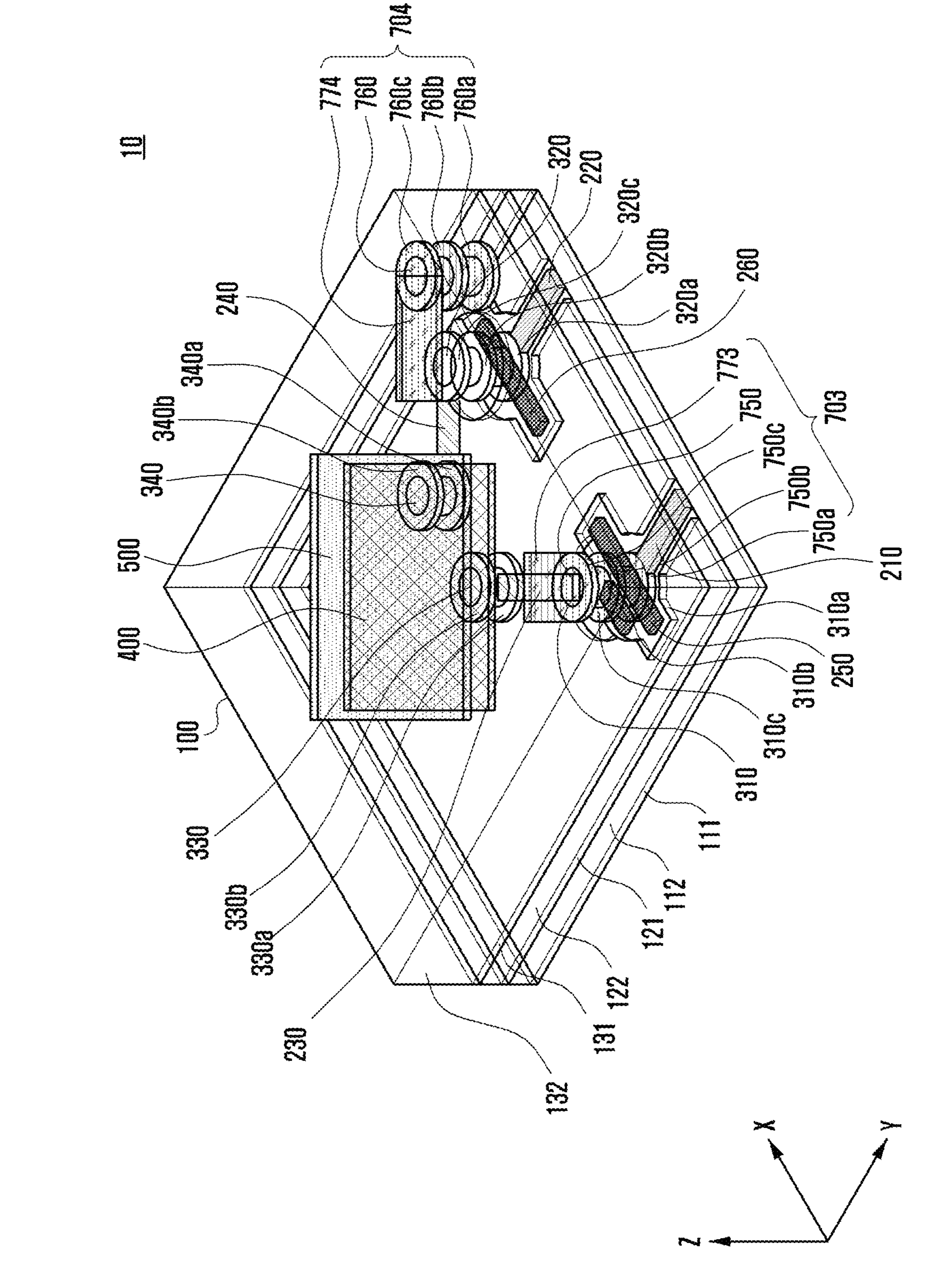
FIG. 17 is a perspective view showing an antenna structure including a third shielding structure and a fourth shielding structure according to an embodiment of the disclosure.

FIG. 17 is a perspective view showing an antenna structure including a third shielding structure 703 and a fourth shielding structure according to an embodiment of the disclosure.

Referring to FIG. 17, identically to the antenna structure 10 in FIGS. 9 to 12, the antenna structure 10 may include a multi-layer PCB 100, a first feed line 210, a second feed line 220, a third feed line 230, a fourth feed line 240, a first impedance matching structure 250, a second impedance matching structure 260, a first via 310, a second via 320, a third via 330, a fourth via 340, a (1a)th via pad 310*a*, a (1b)th via pad 310*b*, a (1c)th via pad 310*c*, a (2a)th via pad 320*a*, a (2b)th via pad 320*b*, a (3a)th via pad 330*a*, a (3b)th via pad 330*b*, a (3c)th via pad 330*c*, a (4a)th via pad 340*a*, a (4b)th via pad 340*b*, a first antenna patch 400, and a second antenna patch 500.

The antenna structure 10 may include a third shielding structure 703 and a fourth shielding structure 704. For example, the third shielding structure 703 may be disposed to surround a part of each of the first via 310, the (1b)th via pad 310*b*, the (1c)th via pad 310*c*, and the second feed line 220. The fourth shielding structure 704 may be disposed to surround a part of each of the third via 330, the (3b)th via pad 330*b*, the (3c)th via pad 330*c*, and the fourth feed line 240.

The third shielding structure 703 may include a fifth shielding via 750, a (5a)th shielding pad 750*a*, a (5b)th shielding pad 750*b*, a (5c)th shielding pad 750*c*, and a third shielding cover 773. The fourth shielding structure 704 may include a sixth shielding via 760, a (6a)th shielding pad 760*a*, a (6b)th shielding pad 760*b*, a (6c)th shielding pad 760*c*, and a fourth shielding cover 774.

Figure 18:
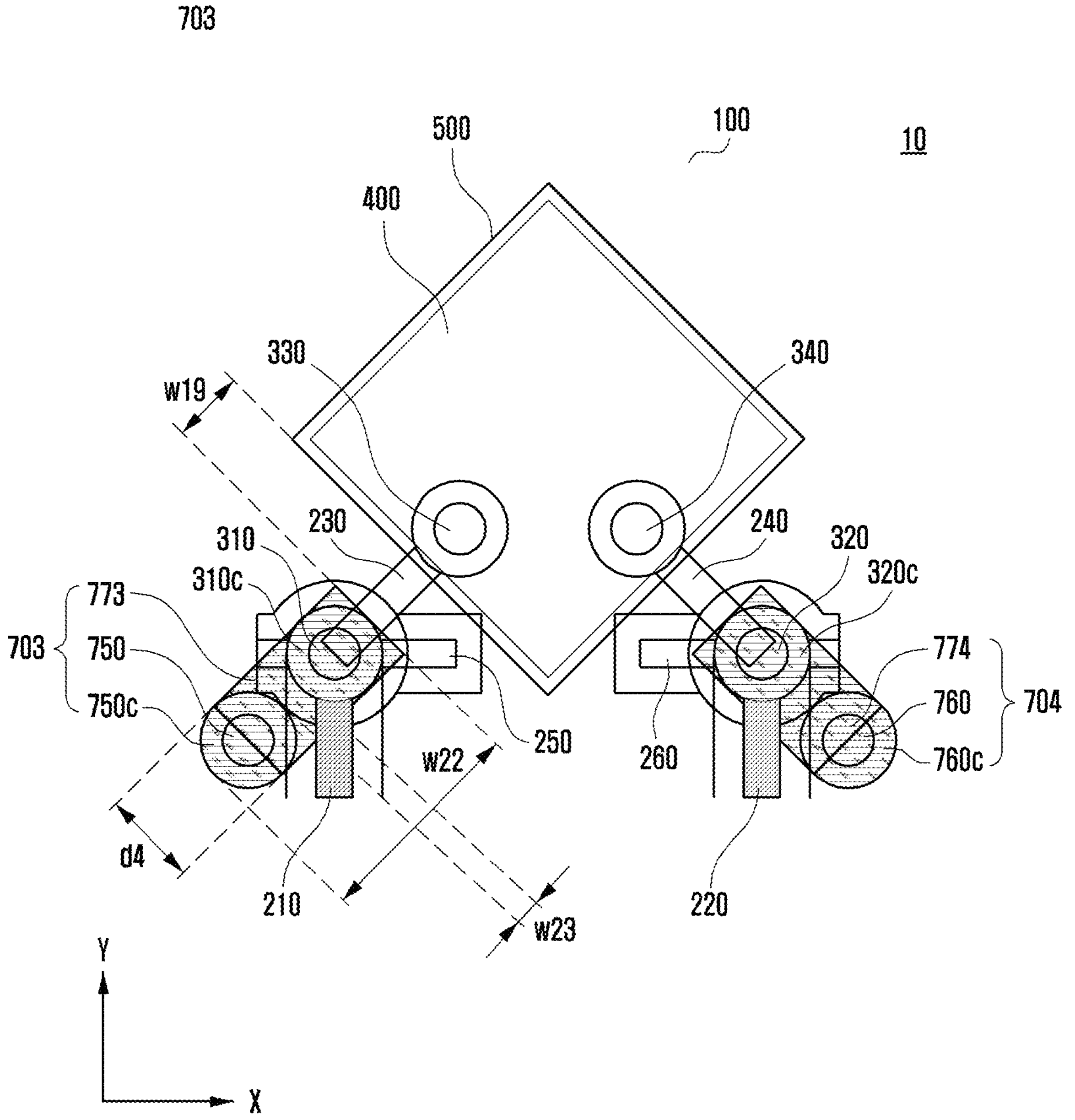
FIG. 18 is a plan view showing an antenna structure with reference to the x-y axis according to an embodiment of the disclosure.

FIG. 18 is a plan view showing an antenna structure with reference to the x-y axis according to an embodiment of the disclosure.

Referring to FIG. 18, the third shielding structure 703 and the fourth shielding structure 704 may be arranged to face each other on the x-y plane.

The third shielding structure 703 may be disposed substantially parallel to a first side surface of the first antenna patch 400. The third shielding cover 773 may be disposed substantially parallel to a first side surface of the first antenna patch 400. The third shielding structure 703 may be spaced apart by a predetermined distance w19 from the first side surface of the first antenna patch 400. The third shielding cover 773 may be spaced apart by a predetermined distance w19 from the first side surface of the first antenna patch 400. For example, the predetermined distance w19 may be determined based on at least one of an operation frequency of the antenna structure 10 and a minimum limitation in the process at the time of manufacturing thereof. For example, in case that an operation frequency of the antenna structure 10 is 140 GHz, the predetermined distance w19 may be approximately 105 μm.

One end of the third shielding cover 773 may be physically coupled to the (5c)th shielding pad 750*c*. The other end of the third shielding cover 773 may be disposed on the upper end of the (1c)th via pad 310*c*. A horizontal length w22 of the third shielding cover 773 may be determined based on at least one of an operation frequency of the antenna structure 10 and a minimum limitation in the process at the time of manufacturing thereof. For example, in case that an operation frequency of the antenna structure 10 is 140 GHz, the horizontal length w22 of the third shielding cover 773 may be approximately 300 μm. A vertical length d4 of the third shielding cover 773 may be determined based on at least one of an operation frequency of the antenna structure 10 and a minimum limitation in the process at the time of manufacturing thereof. For example, in case that an operation frequency of the antenna structure 10 is 140 GHz, the vertical length d4 of the third shielding cover 773 may be approximately 130 μm.

The (5c)th shielding pad 750*c* may be spaced apart by a predetermined distance w23 from (1c)th via pad 310*c* on the x-y plane. For example, the predetermined distance w23 may be determined based on at least one of an operation frequency of the antenna structure 10 and a minimum limitation in the process at the time of manufacturing thereof. For example, in case that an operation frequency of the antenna structure 10 is 140 GHz, the predetermined distance w23 may be approximately 40 μm. The (5a)th shielding pad 750*a*, the (5b)th shielding pad 750*b*, and the (5c)th shielding pad 750*c* may be arranged to overlap each other on the z-axis.

The fourth shielding structure 704 may be disposed substantially parallel to a second side surface of the first antenna patch 400. The fourth shielding cover 774 may be disposed substantially parallel to a second side surface of the first antenna patch 400. The fourth shielding structure 704 may be spaced apart by a predetermined distance w19 from the second side surface of the first antenna patch 400. The fourth shielding cover 774 may be spaced apart by a predetermined distance from the second side surface of the first antenna patch 400. For example, the spaced distance between the fourth shielding structure 704 and the second side surface of the first antenna patch 400 may be equal to as or similar to the spaced distance w19 between the third shielding structure 703 and the first side surface of the first antenna patch 400. For example, the spaced distance between the fourth shielding cover 774 and the second side surface of the first antenna patch 400 may be equal to as or similar to the spaced distance w19 between the third shielding cover 773 and the first side surface of the first antenna patch 400.

One end of the fourth shielding cover 774 may be physically coupled to the (6c)th shielding pad 760*c*. The other end of the fourth shielding cover 774 may be disposed on the upper end of the (3c)th via pad 330*c*. The horizontal length of the fourth shielding cover 774 may be equal to or similar to the horizontal length w22 of the third shielding cover 773.

The (6c)th shielding pad 760*c* may be spaced apart by a predetermined distance from the (3c)th via pad 330*c* on the x-y plane. For example, the spaced distance between the (6c)th shielding pad 760*c* and the (3c)th via pad 330*c* may be equal to or similar to the spaced distance w23 between the (5c)th shielding pad 750*c* and the (1c)th via pad 310*c*.

The (6a)th shielding pad 760*a*, the (6b)th shielding pad 760*b*, and the (6c)th shielding pad 760*c* may be arranged to overlap each other on the z-axis.

Figure 19:
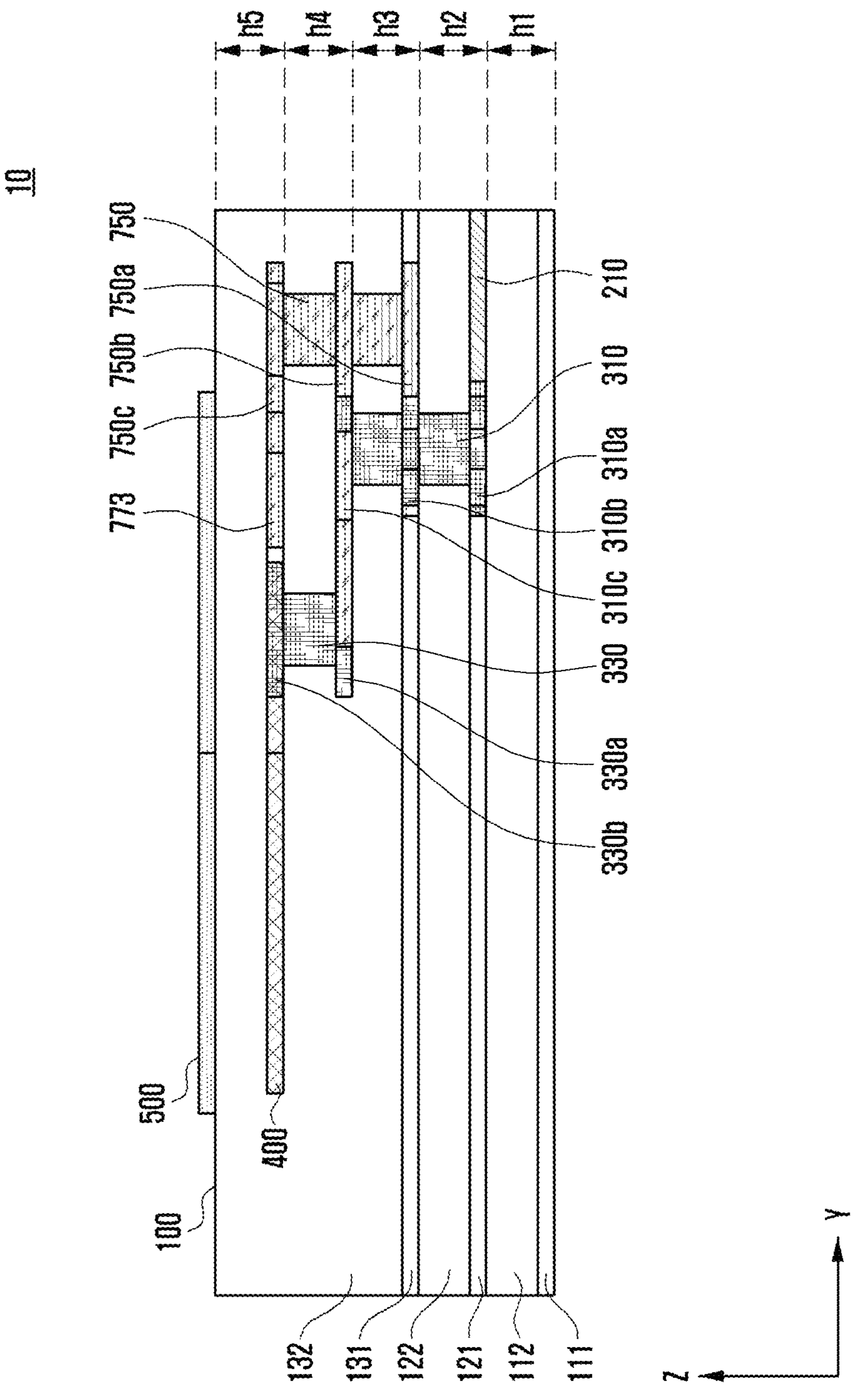
FIG. 19 is a cross-sectional view showing an antenna structure with reference to the y-z axis according to an embodiment of the disclosure.

FIG. 19 is a cross-sectional view showing an antenna structure with reference to the y-z axis according to an embodiment of the disclosure.

Figure 20:
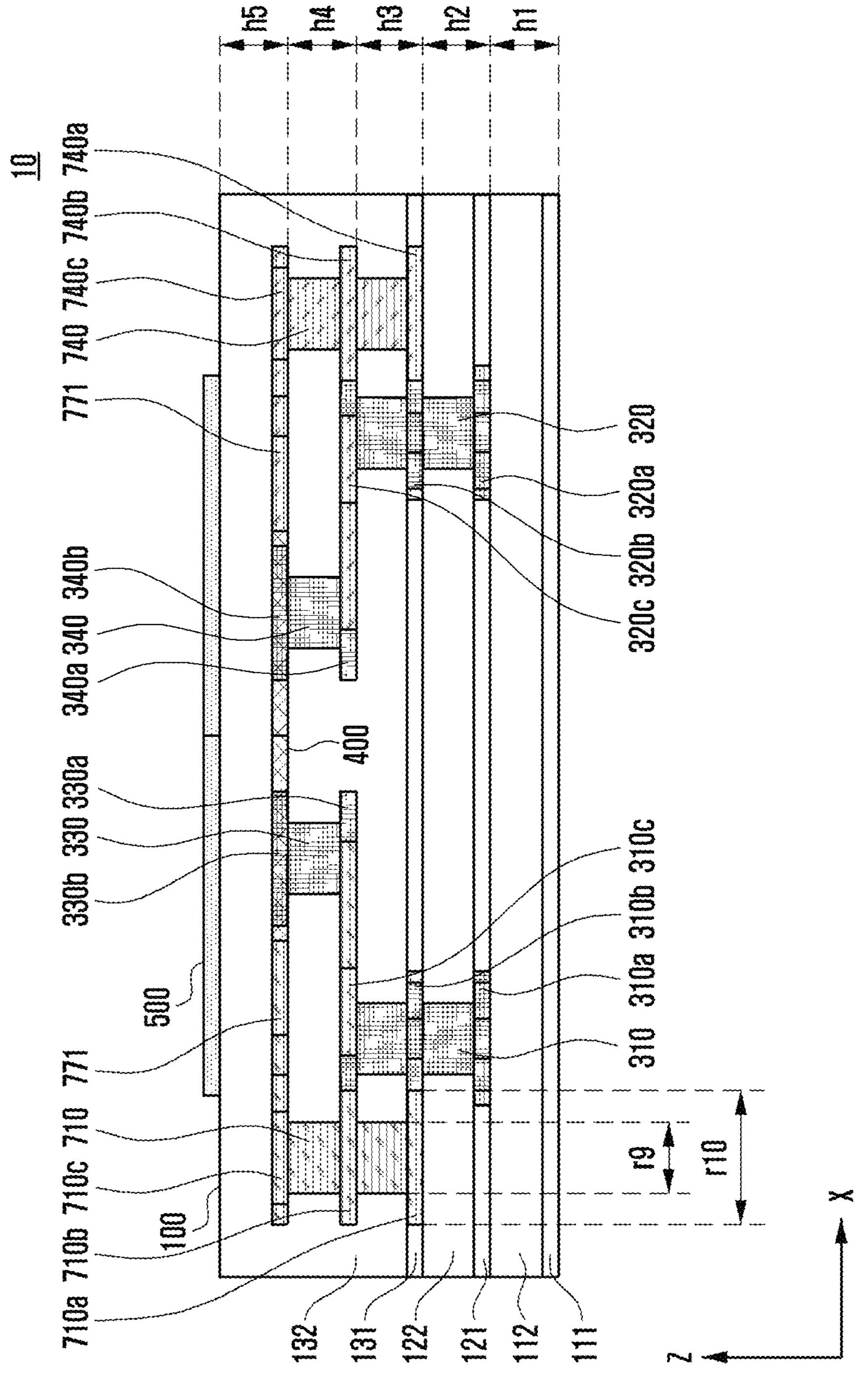
FIG. 20 is a cross-sectional view showing an antenna structure with reference to the x-z axis according to an embodiment of the disclosure.

FIG. 20 is a cross-sectional view showing an antenna structure with reference to the x-z axis according to an embodiment of the disclosure.

Referring to FIGS. 19 and 20, the multi-layer PCB 100 may include a first layer to a sixth layer. For example, the first layer of the multi-layer PCB 100 may correspond to the second antenna patch 500. The second layer of the multi-layer PCB 100 may correspond to at least one of the first antenna patch 400, the third shielding cover 773, and the fourth shielding cover 774. The third layer of the multi-layer PCB 100 may correspond to at least one of the (3a)th via pad 330*a*, the (4a)th via pad 340*a*, the (5b)th shielding pad 750*b*, and the (6b)th shielding pad 760*b*. The fourth layer of the multi-layer PCB 100 may correspond to the third substrate 131. The fifth layer of the multi-layer PCB 100 may correspond to the second substrate 121. The sixth layer of the multi-layer PCB 100 may correspond to the first substrate 111.

One end of the fifth shielding via 750 may be physically connected to the (5c)th shielding pad 750*c*. The other end of the fifth shielding via 750 may be spaced apart by the predetermined height h4 from the (1c)th via pad 310*c*.

The (5a)th shielding pad 750*a* may be disposed on the third substrate 131. The (5a)th shielding pad 750*a* may be disposed on the first step of the fifth shielding via 750. The (5a)th shielding pad 750*a* may be disposed adjacent to the (1b)th via pad 310*b* in the third substrate 131.

A diameter r9 of the fifth shielding via 750 may be determined based on at least one of an operation frequency of the antenna structure 10 and a minimum limitation in the process at the time of manufacturing thereof. For example, in case that an operation frequency of the antenna structure 10 is 140 GHz, the diameter r9 of the fifth shielding via 750 may be approximately 70 μm. For example, the diameter r10 of the (5a)th shielding pad 750*a* may be determined based on at least one of an operation frequency of the antenna structure 10 and a minimum limitation in the process at the time of manufacturing thereof. For example, in case that an operation frequency of the antenna structure 10 is 140 GHz, the diameter r10 of the (5a)th shielding pad 750*a* may be approximately 130 μm.

The (5b)th shielding pad 750*b* may be disposed on the second step of the fifth shielding via 750. The (5b)th shielding pad 750*b* may be spaced apart by the predetermined height h3 from the (5a)th shielding pad 750*a*. The (5b)th shielding pad 750*b* may be adjacently disposed at a height substantially the same as the (1c)th via pad 310*c*. The diameter of the (5b)th shielding pad 750*b* may be equal to or similar to the diameter r10 of the (5a)th shielding pad 750*a*.

The (5c)th shielding pad 750*c* may be disposed on the third step of the fifth shielding via 750. The (5c)th shielding pad 750*c* may be spaced apart by the predetermined height h4 from the (5b)th shielding pad 750*b*. The diameter of the (5c)th shielding pad 750*c* may be equal to or similar to the diameter r0 of the (5a)th shielding pad 750*a*.

The third shielding cover 773 may be spaced apart by the predetermined height h4 from the (1c)th via pad 310*c*. The third shielding cover 773 may be disposed at a height substantially the same as the probe feed.

One end of the sixth shielding via 760 may be physically connected to the (6c)th shielding pad 760*c*. The other end of the sixth shielding via 760 may be spaced apart by the predetermined height h4 from the (3c)th via pad 330*c*.

The (6a)th shielding pad 760*a* may be disposed on the third substrate 131. The (6a)th shielding pad 760*a* may be disposed on the first step of the sixth shielding via 760. The (6a)th shielding pad 760*a* may be disposed adjacent to the (3b)th via pad 330*b* in the third substrate 131.

The diameter of the sixth shielding via 760 may be equal to or similar to the diameter r9 of the fifth shielding via 750. The diameter of the (6a)th shielding pad 760*a* may be equal to or similar to the diameter r10 of the (5a)th shielding pad 750*a*.

The (6b)th shielding pad 760*b* may be disposed on the second step of the sixth shielding via 760. The (6b)th shielding pad 760*b* may be spaced apart by the predetermined height h3 from the (6a)th shielding pad 760*a*. The (6b)th shielding pad 760*b* may be adjacently disposed at a height substantially the same as the (3c)th via pad 330*c*. The diameter of the (6b)th shielding pad 760*b* may be equal to or similar to the diameter r10 of the (5a)th shielding pad 750*a*.

The (6c)th shielding pad 760*c* may be disposed on the third step of the sixth shielding via 760. The (6c)th shielding pad 760*c* may be spaced apart by the predetermined height h4 from the (6b)th shielding pad 760*b*. The diameter of the (6c)th shielding pad 760*c* may be equal to or similar to the diameter r0 of the (5a)th shielding pad 750*a*.

The fourth shielding cover 774 may be spaced apart by the predetermined height h4 from the (3c)th via pad 330*c*. The fourth shielding cover 774 may be disposed at a height substantially the same as the first antenna patch 400.

Figure 21:
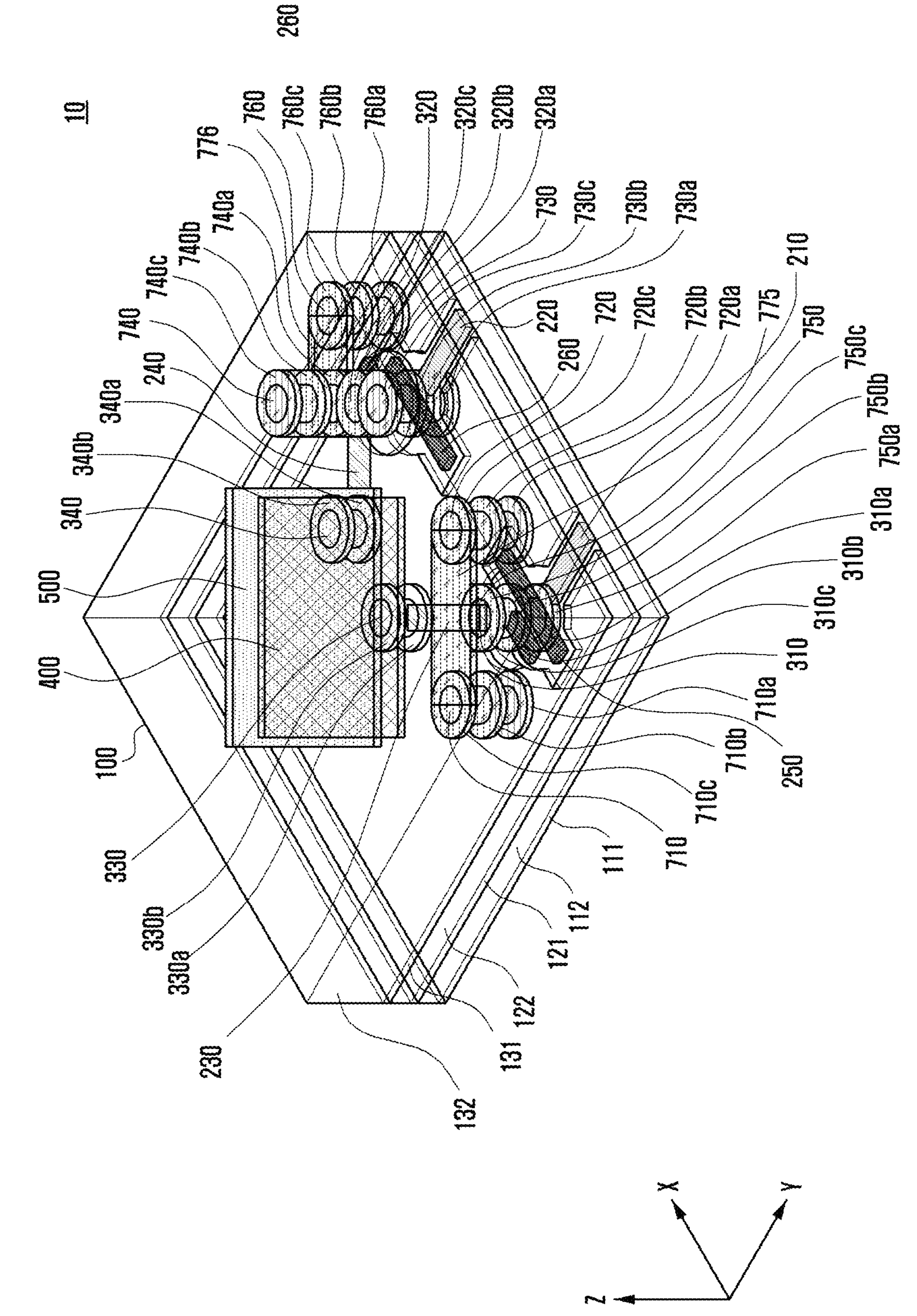
FIG. 21 is a perspective view showing an antenna structure including a fifth shielding structure and a sixth shielding structure according to an embodiment of the disclosure.

FIG. 21 is a perspective view showing an antenna structure including a fifth shielding structure and a sixth shielding structure according to an embodiment of the disclosure.

Referring to FIG. 21, identically to the antenna structure 10 in FIGS. 9 to 12, the antenna structure 10 may include a multi-layer PCB 100, a first feed line 210, a second feed line 220, a third feed line 230, a fourth feed line 240, a first impedance matching structure 250, a second impedance matching structure 260, a first via 310, a second via 320, a third via 330, a fourth via 340, a (1a)th via pad 310*a*, a (1b)th via pad 310*b*, a (1c)th via pad 310*c*, a (2a)th via pad 320*a*, a (2b)th via pad 320*b*, a (3a)th via pad 330*a*, a (3b)th via pad 330*b*, a (3c)th via pad 330*c*, a (4a)th via pad 340*a*, a (4b)th via pad 340*b*, a first antenna patch 400, and a second antenna patch 500.

The antenna structure 10 may include a fifth shielding structure and a sixth shielding structure. For example, the fifth shielding structure may be disposed to surround a part of each of the first via 310, the (1b)th via pad 310*b*, the (1c)th via pad 310*c*, and the second feed line 220. The sixth shielding structure may be disposed to surround a part of each of the third via 330, the (3b)th via pad 330*b*, the (3c)th via pad 330*c*, and the fourth feed line 240.

The fifth shielding structure may include a first shielding via 710, a second shielding via 720, a fifth shielding via 750, a (1a)th shielding pad 710*a*, a (1b)th shielding pad 710*b*, a (1c)th shielding pad 710*c*, a (2a)th shielding pad 720*a*, a (2b)th shielding pad 720*b*, a (2c)th shielding pad 720*c*, a (5a)th shielding pad 750*a*, a (5b)th shielding pad 750*b*, a (5c)th shielding pad 750*c*, and a fifth shielding cover 775.

The sixth shielding structure may include a third shielding via 730, a fourth shielding via 740, a sixth shielding via 760, a (3a)th shielding pad 730*a*, a (3b)th shielding pad 730*b*, a (3c)th shielding pad 730*c*, a (4a)th shielding pad 740*a*, a (4b)th shielding pad 740*b*, a (4c)th shielding pad 740*c*, a (6a)th shielding pad 760*a*, a (6b)th shielding pad 760*b*, a (6c)th shielding pad 760*c*, and a sixth shielding cover 776.

Figure 22:
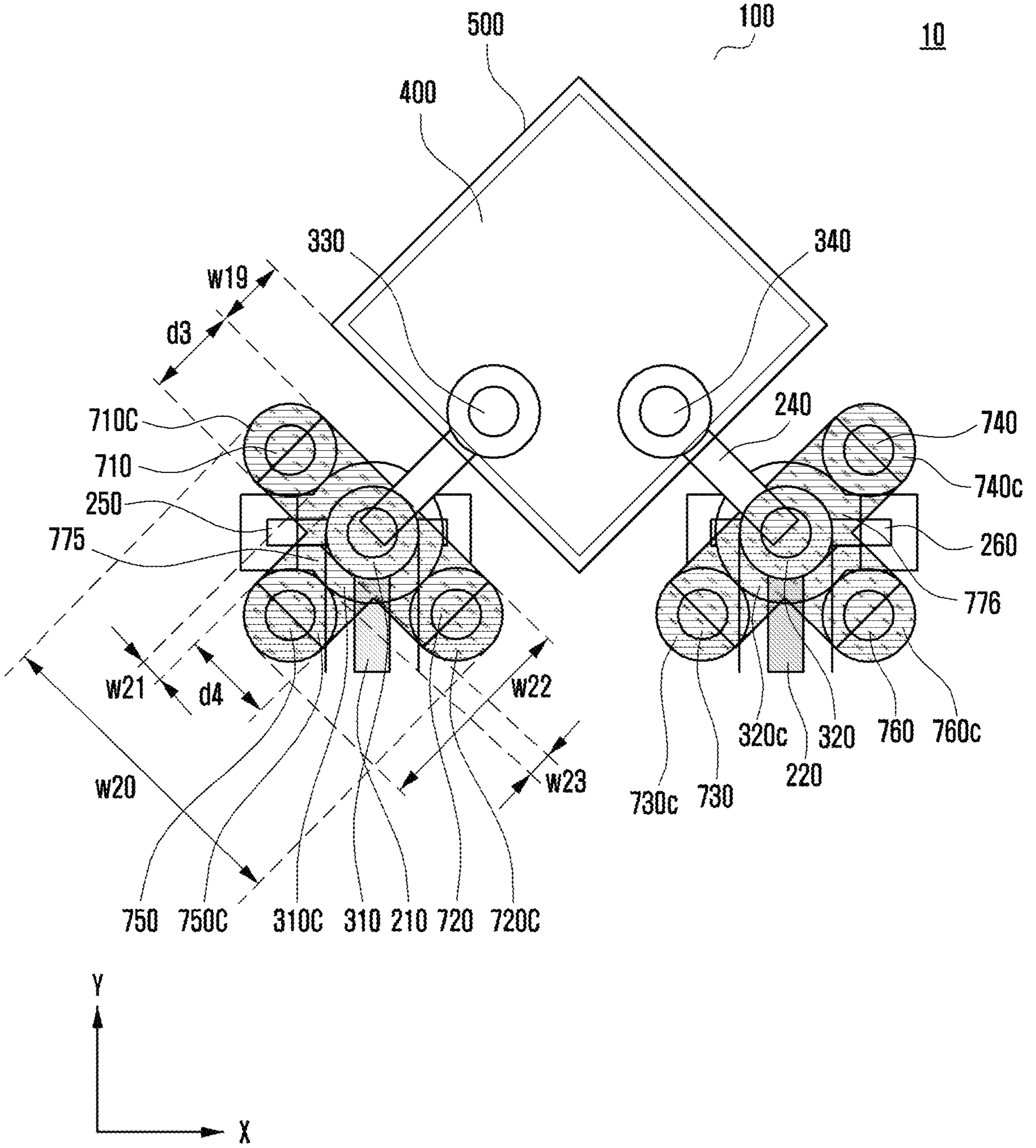
FIG. 22 is a plan view showing an antenna structure with reference to the x-y axis according to an embodiment of the disclosure.

FIG. 22 is a plan view showing an antenna structure with reference to the x-y axis according to an embodiment of the disclosure.

Referring to FIG. 22, the fifth shielding structure and the sixth shielding structure may be arranged to face each other on the x-y plane.

The fifth shielding structure may be disposed substantially parallel to a first side surface of the first antenna patch 400. The fifth shielding cover 775 may be disposed substantially parallel to a first side surface of the first antenna patch 400. The fifth shielding structure may be spaced apart by a predetermined distance w19 from the first side surface of the first antenna patch 400. The fifth shielding cover 775 may be spaced apart by a predetermined distance w19 from the first side surface of the first antenna patch 400. The predetermined distance w19 may be determined based on at least one of an operation frequency of the antenna structure 10 and a minimum limitation in the process at the time of manufacturing thereof. For example, in case that an operation frequency of the antenna structure 10 is 140 GHz, the predetermined distance w19 may be approximately 105 μm.

A first step of the fifth shielding cover 775 may be physically coupled to the (1c)th shielding pad 710*c*. A second step of the fifth shielding cover 775 may be physically coupled to the (2c)th shielding pad 720*c*. A third step of the fifth shielding cover 775 may be physically coupled to the (5c)th shielding pad 750*c*.

The (1c)th shielding pad 710*c* may be spaced apart by a predetermined distance w21 from (1c)th via pad 310*c* on the x-y plane. For example, the predetermined distance w21 may be determined based on at least one of an operation frequency of the antenna structure 10 and a minimum limitation in the process at the time of manufacturing thereof. For example, in case that an operation frequency of the antenna structure 10 is 140 GHz, the predetermined distance w21 may be approximately 40 μm. The (1a)th shielding pad 710*a*, the (1b)th shielding pad 710*b*, and the (1c)th shielding pad 710*c* may be arranged to overlap each other on the z-axis.

The (2c)th shielding pad 720*c* may be spaced apart by a predetermined distance from the (1c)th via pad 310*c* on the x-y plane. For example, the spaced distance between the (2c)th shielding pad 720*c* and the (1c)th via pad 310*c* may be equal to or similar to the spaced distance w21 between the (1c)th shielding pad 710*c* and the (1c)th via pad 310*c*. The (2c)th shielding pad 720*c* may be disposed to face the (1c)th via pad 710*c* with reference to the (1c)th via pad 310*c*. The (2a)th shielding pad 720*a*, the (2b)th shielding pad 720*b*, and the (2c)th shielding pad 720*c* may be arranged to overlap each other on the z-axis.

The (5c)th shielding pad 750*c* may be spaced apart by a predetermined distance w23 from (1c)th via pad 310*c* on the x-y plane. For example, the predetermined distance w23 may be determined based on at least one of an operation frequency of the antenna structure 10 and a minimum limitation in the process at the time of manufacturing thereof. For example, in case that an operation frequency of the antenna structure 10 is 140 GHz, the predetermined distance w23 may be approximately 40 μm. The (5a)th shielding pad 750*a*, the (5b)th shielding pad 750*b*, and the (5c)th shielding pad 750*c* may be arranged to overlap each other on the z-axis.

The sixth shielding structure may be disposed substantially parallel to a second side surface of the probe feed. The sixth shielding cover 776 may be disposed substantially parallel to the second side surface of the probe feed. The sixth shielding structure may be spaced apart by a predetermined distance from the second side surface of the probe feed. The sixth shielding cover 776 may be spaced apart by a predetermined distance from the second side surface of the probe feed.

A first step of the sixth shielding cover 776 may be physically coupled to the (3c)th shielding pad 730*c*. A second step of the sixth shielding cover 776 may be physically coupled to the (4c)th shielding pad 740*c*. A third step of the sixth shielding cover 776 may be physically coupled to the (6c)th shielding pad 760*c*.

The (3c)th shielding pad 730*c* may be spaced apart by a predetermined distance from the (3c)th via pad 330*c* on the x-y plane. For example, the spaced distance between the (3c)th shielding pad 730*c* and the (3c)th via pad 330*c* may be equal to or similar to the spaced distance w21 between the (1c)th shielding pad 710*c* and the (1c)th via pad 310*c*. The (3a)th shielding pad 730*a*, the (3b)th shielding pad 730*b*, and the (3c)th shielding pad 730*c* may be arranged to overlap each other on the z-axis.

The (4c)th shielding pad 740*c* may be spaced apart by a predetermined distance from the (3c)th via pad 330*c* on the x-y plane. For example, the spaced distance between the (4c)th shielding pad 740*c* and the (3c)th via pad 330*c* may be equal to or similar to the spaced distance w21 between the (1c)th shielding pad 710*c* and the (1c)th via pad 310*c*. The (4c)th shielding pad 740*c* may be disposed to face the (3c)th via pad 730*c* with reference to the (3c)th via pad 330*c*. The (4a)th shielding pad 740*a*, the (4b)th shielding pad 740*b*, and the (4c)th shielding pad 740*c* may be arranged to overlap each other on the z-axis.

The (6c)th shielding pad 760*c* may be spaced apart by a predetermined distance from (3c)th via pad 330*c* on the x-y plane. For example, the spaced distance between the (6c)th shielding pad 760*c* and the (3c)th via pad 330*c* may be equal to or similar to the spaced distance w21 between the (1c)th shielding pad 710*c* and the (1c)th via pad 310*c*.

The (6a)th shielding pad 760*a*, the (6b)th shielding pad 760*b*, and the (6c)th shielding pad 760*c* may be arranged to overlap each other on the z-axis.

Figure 23:
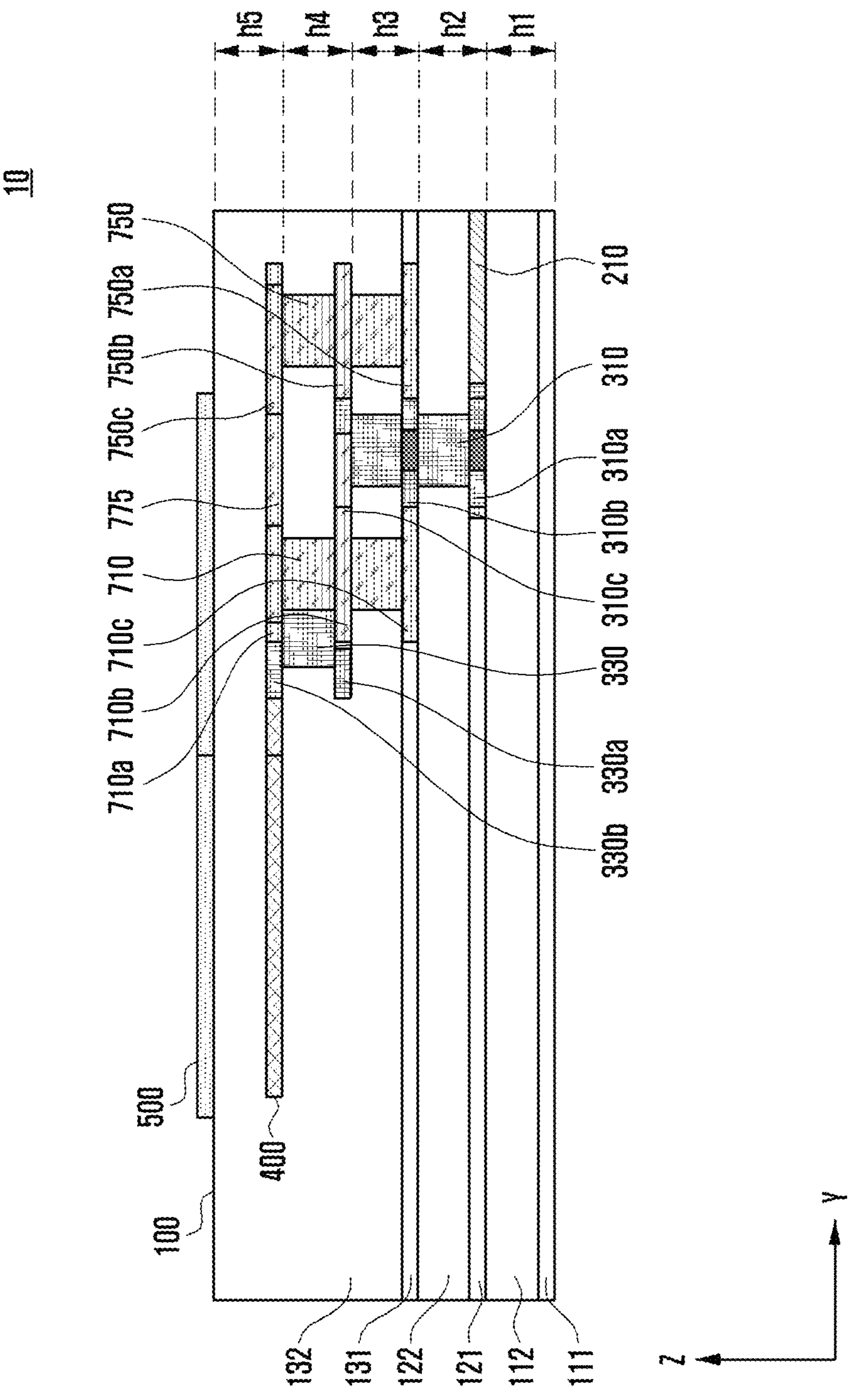
FIG. 23 is a cross-sectional view showing an antenna structure with reference to the y-z axis according to an embodiment of the disclosure.

FIG. 23 is a cross-sectional view showing an antenna structure with reference to the y-z axis according to an embodiment of the disclosure.

Figure 24:
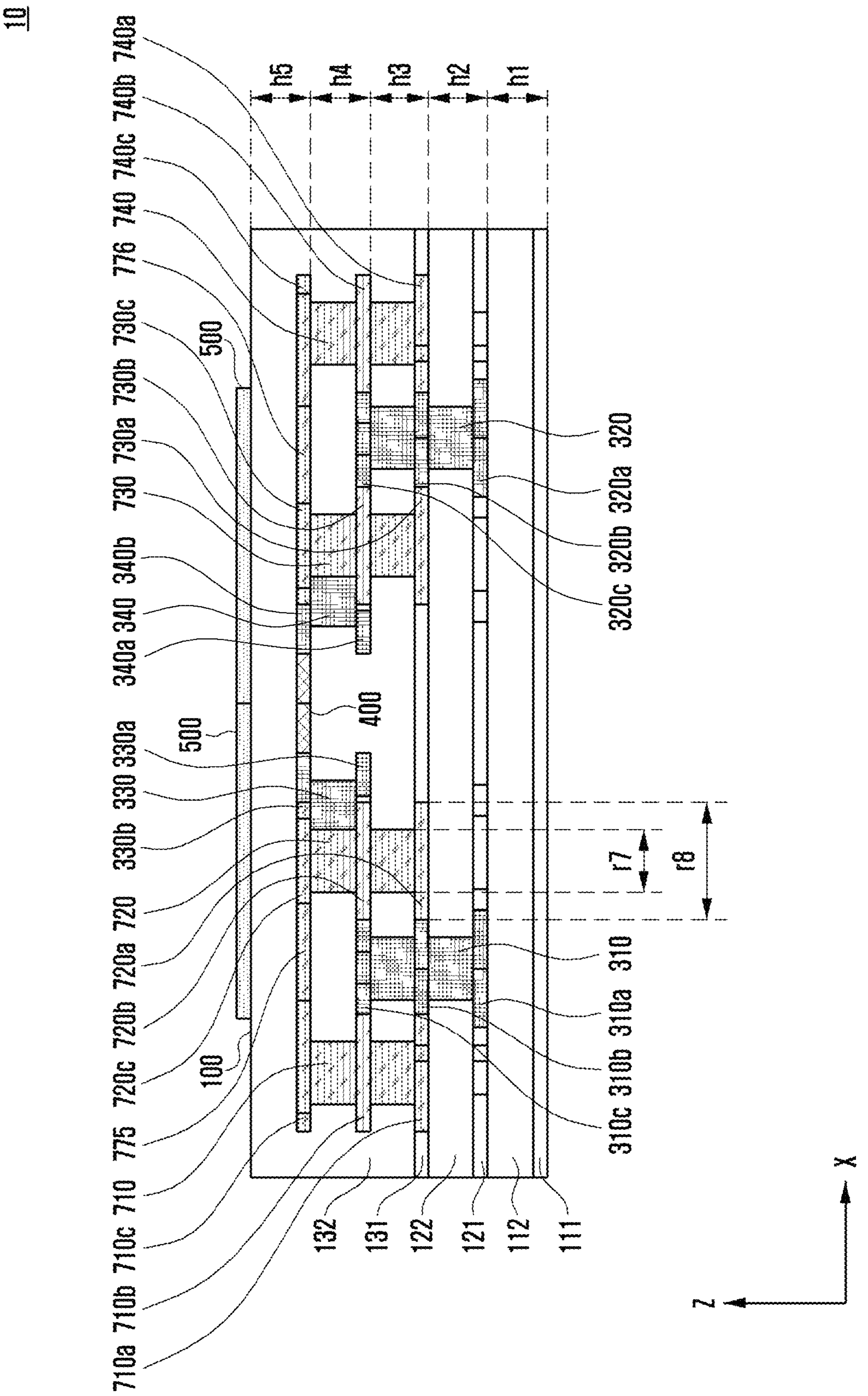
FIG. 24 is a cross-sectional view showing an antenna structure with reference to the x-z axis according to an embodiment of the disclosure.

FIG. 24 is a cross-sectional view showing an antenna structure with reference to the x-z axis according to an embodiment of the disclosure.

Referring to FIGS. 23 and 24, the multi-layer PCB 100 may include a first layer to a sixth layer. For example, the first layer of the multi-layer PCB 100 may correspond to the second antenna patch 500. The second layer of the multi-layer PCB 100 may correspond to at least one of the first antenna patch 400, the fifth shielding cover 775, and the sixth shielding cover 776. The third layer of the multi-layer PCB 100 may correspond to at least one of the (3a)th via pad 330*a*, the (4a)th via pad 340*a*, the (1b)th shielding pad 710*b*, the (2b)th shielding pad 720*b*, the (3b)th shielding pad 730*b*, the (4b)th shielding pad 740*b*, the (5b)th shielding pad 750*b*, and the (6b)th shielding pad 760*b*. The fourth layer of the multi-layer PCB 100 may correspond to the third substrate 131. The fifth layer of the multi-layer PCB 100 may correspond to the second substrate 121. The sixth layer of the multi-layer PCB 100 may correspond to the first substrate 111.

One end of the first shielding via 710 may be physically connected to the (1a)th shielding pad 710*a*. The other end of the first shielding via 710 may be physically connected to the (1c)th shielding pad 710*c*.

The (1a)th shielding pad 710*a* may be disposed on the third substrate 131. The (1a)th shielding pad 710*a* may be disposed on the first step of the first shielding via 710. The (1a)th shielding pad 710*a* may be disposed adjacent to the (1b)th via pad 310*b* in the third substrate 131. The diameter r7 of the first shielding via 710 may be determined based on at least one of an operation frequency of the antenna structure 10 and a minimum limitation in the process at the time of manufacturing thereof. For example, in case that an operation frequency of the antenna structure 10 is 140 GHz, the diameter r7 of the first shielding via 710 may be approximately 70 μm. The diameter r8 of the (1a)th shielding pad 710*a* may be determined based on at least one of an operation frequency of the antenna structure 10 and a minimum limitation in the process at the time of manufacturing thereof. For example, in case that an operation frequency of the antenna structure 10 is 140 GHz, the diameter r8 of the (1a)th shielding pad 710*a* may be approximately 130 μm.

The (1b)th shielding pad 710*b* may be disposed on the second step of the first shielding via 710. The (1b)th shielding pad 710*b* may be spaced apart by the predetermined height h3 from the (1a)th shielding pad 710*a*. The (1b)th shielding pad 710*b* may be adjacently disposed at a height substantially the same as the (1c)th via pad 310*c*. The diameter of the (1b)th shielding pad 710*b* may be equal to or similar to the diameter r8 of the (1a)th shielding pad 710*a*.

The (1c)th shielding pad 710*c* may be disposed on the third step of the first shielding via 710. The (1c)th shielding pad 710*c* may be spaced apart by the predetermined height h4 from the (1b)th shielding pad 710*b*. The diameter of the (1c)th shielding pad 710*c* may be equal to or similar to the diameter r8 of the (1a)th shielding pad 710*a*.

One end of the second shielding via 720 may be physically connected to the (2a)th shielding pad 720*a*. The other end of the second shielding via 720 may be physically connected to the (2c)th shielding pad 720*c*.

The (2a)th shielding pad 720*a* may be disposed on the third substrate 131. The (2a)th shielding pad 720*a* may be disposed on the first step of the second shielding via 720. The (2a)th shielding pad 720*a* may be disposed adjacent to the (1b)th via pad 310*b* in the third substrate 131. The diameter of the second shielding via 720 may be equal to or similar to the diameter r7 of the first shielding via 710. The diameter of the (2a)th shielding pad 720*a* may be equal to or similar to the diameter r8 of the (1a)th shielding pad 710*a*.

The (2b)th shielding pad 720*b* may be disposed on the second step of the second shielding via 720. The (2b)th shielding pad 720*b* may be spaced apart by the predetermined height h3 from the (2a)th shielding pad 720*a*. The (2b)th shielding pad 720*b* may be adjacently disposed at a height substantially the same as the (1c)th via pad 310*c*. The diameter of the (2b)th shielding pad 720*b* may be equal to or similar to the diameter r8 of the (1a)th shielding pad 710*a*.

The (2c)th shielding pad 720*c* may be disposed on the third step of the second shielding via 720. The (2c)th shielding pad 720*c* may be spaced apart by the predetermined height h4 from the (2b)th shielding pad 720*b*.

One end of the fifth shielding via 750 may be physically connected to the (5c)th shielding pad 750*c*. The other end of the fifth shielding via 750 may be spaced apart by the predetermined height h4 from the (1c)th via pad 310*c*.

The (5a)th shielding pad 750*a* may be disposed on the third substrate 131. The (5a)th shielding pad 750*a* may be disposed on the first step of the fifth shielding via 750. The (5a)th shielding pad 750*a* may be disposed adjacent to the (1b)th via pad 310*b* in the third substrate 131.

The (5b)th shielding pad 750*b* may be disposed on the second step of the fifth shielding via 750. The (5b)th shielding pad 750*b* may be spaced apart by the predetermined height h3 from the (5a)th shielding pad 750*a*. The (5b)th shielding pad 750*b* may be adjacently disposed at a height substantially the same as the (1c)th via pad 310*c*.

The (5c)th shielding pad 750*c* may be disposed on the third step of the fifth shielding via 750. The (5c)th shielding pad 750*c* may be spaced apart by the predetermined height h4 from the (5b)th shielding pad 750*b*.

The fifth shielding cover 775 may be spaced apart by the predetermined height h4 from the (1c)th via pad 310*c*. The fifth shielding cover 775 may be disposed at a height substantially the same as the first antenna patch 400.

One end of the third shielding via 730 may be physically connected to the (3a)th shielding pad 730*a*. The other end of the third shielding via 730 may be physically connected to the (3c)th shielding pad 730*c*.

The (3a)th shielding pad 730*a* may be disposed on the third substrate 131. The (3a)th shielding pad 730*a* may be disposed on the first step of the third shielding via 730. The (3a)th shielding pad 730*a* may be disposed adjacent to the (3b)th via pad 330*b* in the third substrate 131.

The (3b)th shielding pad 730*b* may be disposed on the second step of the third shielding via 730. The (3b)th shielding pad 730*b* may be spaced apart by the predetermined height h3 from the (3a)th shielding pad 730*a*. The (3b)th shielding pad 730*b* may be adjacently disposed at a height substantially the same as the (3c)th via pad 330*c*.

The (3c)th shielding pad 730*c* may be disposed on the third step of the third shielding via 730. The (3c)th shielding pad 730*c* may be spaced apart by the predetermined height h4 from the (3b)th shielding pad 730*b*.

One end of the fourth shielding via 740 may be physically connected to the (4a)th shielding pad 740*a*. The other end of the fourth shielding via 740 may be physically connected to the (4c)th shielding pad 740*c*.

The (4a)th shielding pad 740*a* may be disposed on the third substrate 131. The (4a)th shielding pad 740*a* may be disposed on the first step of the fourth shielding via 740. The (4a)th shielding pad 740*a* may be disposed adjacent to the (3b)th via pad 330*b* in the third substrate 131.

The (4b)th shielding pad 740*b* may be disposed on the second step of the fourth shielding via 740. The (4b)th shielding pad 740*b* may be spaced apart by the predetermined height h3 from the (4a)th shielding pad 740*a*. The (4b)th shielding pad 740*b* may be adjacently disposed at a height substantially the same as the (3c)th via pad 330*c*.

The (4c)th shielding pad 740*c* may be disposed on the third step of the fourth shielding via 740. The (4c)th shielding pad 740*c* may be spaced apart by the predetermined height h4 from the (4b)th shielding pad 740*b*.

One end of the sixth shielding via 760 may be physically connected to the (6c)th shielding pad 760*c*. The other end of the sixth shielding via 760 may be spaced apart by the predetermined height h4 from the (3c)th via pad 330*c*.

The (6a)th shielding pad 760*a* may be disposed on the third substrate 131. The (6a)th shielding pad 760*a* may be disposed on the first step of the sixth shielding via 760. The (6a)th shielding pad 760*a* may be disposed adjacent to the (3b)th via pad 330*b* in the third substrate 131.

The (6b)th shielding pad 760*b* may be disposed on the second step of the sixth shielding via 760. The (6b)th shielding pad 760*b* may be spaced apart by the predetermined height h3 from the (6a)th shielding pad 760*a*. The (6b)th shielding pad 760*b* may be adjacently disposed at a height substantially the same as the (3c)th via pad 330*c*.

The (6c)th shielding pad 760*c* may be disposed on the third step of the sixth shielding via 760. The (6c)th shielding pad 760*c* may be spaced apart by the predetermined height h4 from the (6b)th shielding pad 760*b*.

The sixth shielding cover 776 may be spaced apart by the predetermined height h4 from the (3c)th via pad 330*c*. The sixth shielding cover 776 may be disposed at a height substantially the same as the first antenna patch 400.

Figure 25:
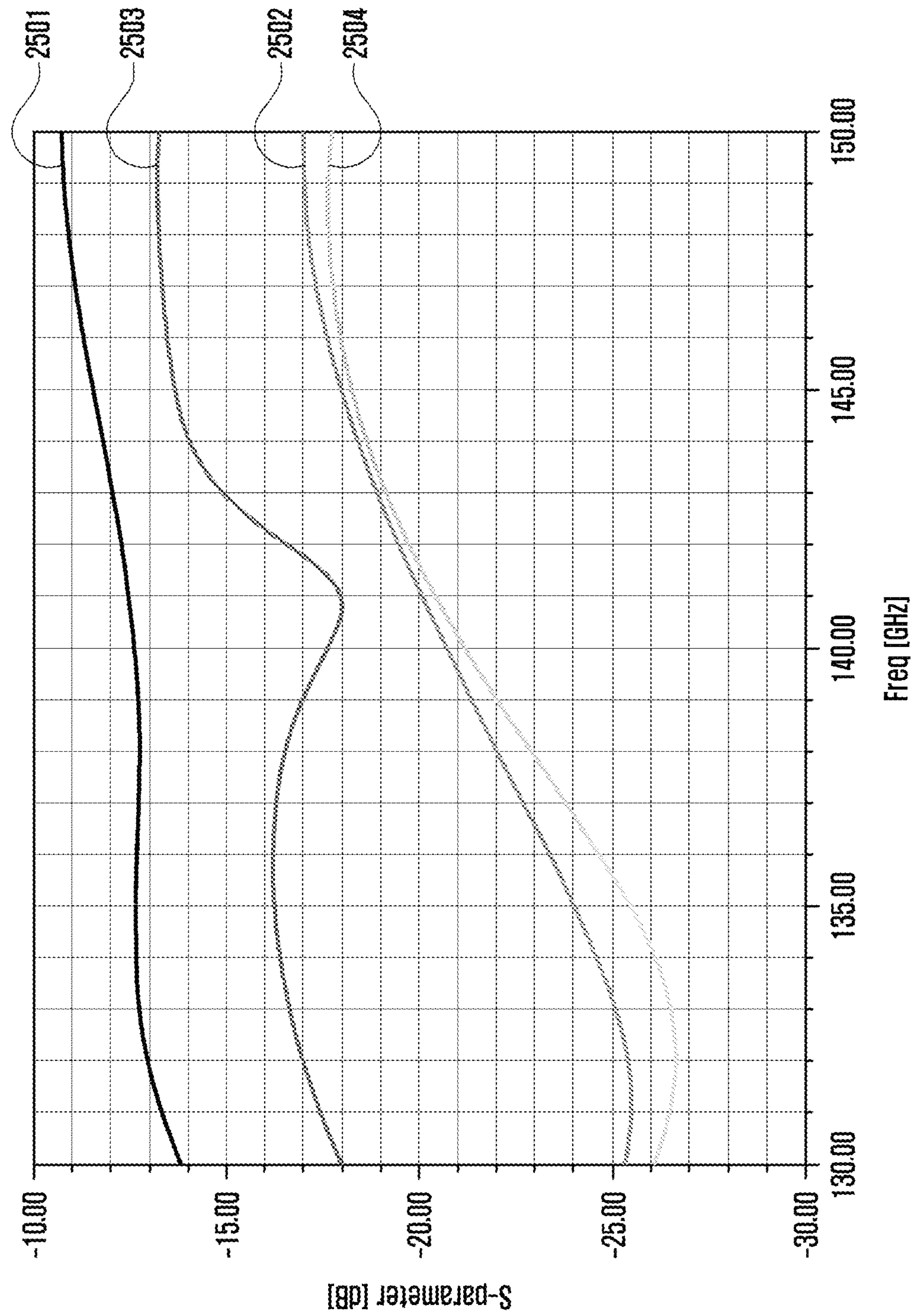
FIG. 25 is a graph showing an isolation characteristic between antenna ports and of the antenna structure according to an embodiment of the disclosure.

FIG. 25 is a graph showing an isolation characteristic between antenna ports and of the antenna structure according to an embodiment of the disclosure.

Referring to FIG. 25, an isolation characteristic S21 (S-parameter, dB) between the first antenna port 210 and the second antenna port 220 according to the antenna structure 10 in FIGS. 9 to 12 may be shown as in a first graph 2501. For example, in case that an operation frequency of the antenna structure 10 in FIGS. 9 to 12 is 140 GHz, a value of the isolation characteristic S21 between the first antenna port 210 and the second antenna port 220 may be −12.63 dB.

An isolation characteristic S21 (S-parameter, dB) between the first antenna port 210 and the second antenna port 220 according to the antenna structure 10 in FIGS. 13 to 16 may be shown as in a second graph 2502. For example, in case that an operation frequency of the antenna structure 10 in FIGS. 13 to 16 is 140 GHz, a value of the isolation characteristic S21 between the first antenna port 210 and the second antenna port 220 may be −20.71 dB.

An isolation characteristic S21 (S-parameter, dB) between the first antenna port 210 and the second antenna port 220 according to the antenna structure 10 in FIGS. 17 to 20 may be shown as in a third graph 2503. For example, in case that an operation frequency of the antenna structure 10 in FIGS. 17 to 20 is 140 GHz, a value of the isolation characteristic S21 between the first antenna port 210 and the second antenna port 220 may be approximately −17.63 dB.

An isolation characteristic S21 (S-parameter, dB) between the first antenna port 210 and the second antenna port 220 according to the antenna structure 10 in FIGS. 21 to 24 may be shown as in a fourth graph 2504. For example, in case that an operation frequency of the antenna structure 10 in FIGS. 21 to 24 is 140 GHz, a value of the isolation characteristic S21 between the first antenna port 210 and the second antenna port 220 may be approximately −21.17 dB.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna module in a wireless communication system, the antenna module comprising:

a multi-layer printed circuit board (PCB) comprising a first to a sixth layer;

a first feed line disposed in a first area of one side surface of the fifth layer of the multi-layer PCB;

a second feed line disposed in a second area of the one side surface of the fifth layer to face the first feed line;

a first via extending through the first area of the fifth layer and a first area of the fourth layer of the multi-layer PCB, and having one end electrically connected to the first feed line and the other end extending by a first height in a vertical direction from the first area of the fourth layer;

a second via extending through the second area of the fifth layer and a second area of the fourth layer while facing the first via, and having one end electrically connected to the second feed line and the other end extending by the first height in a vertical direction from the second area of the fourth layer;

a third feed line having one end electrically connected to the other end of the first via, and the other end extending horizontally in a first direction from the other end of the first via;

a fourth feed line facing the third feed line, having one end electrically connected to the other end of the second via, and extending horizontally in a second direction from the other end of the second via;

a third via having one end electrically connected to the other end of the third feed line, and the other end configured to extend through a fourth area of the third layer and extend by a second height in a vertical direction;

a fourth via facing the third via, and having one end electrically connected to the other end of the fourth feed line and the other end configured to extend through the fourth area of the fourth layer and extend by the second height in a vertical direction;

a first antenna patch having a lower surface electrically connected to the other end of the third via and the other end of the fourth via; and a second antenna patch spaced apart by a predetermined third height from an upper surface of the first antenna patch, wherein a spaced distance between the first via and the second via is greater than a spaced distance between the third via and the fourth via.

2. The antenna module of claim 1, wherein the first via comprises:

a (1a)th via pad disposed in the first area of the fifth layer and physically coupled to one end of the first via;

a (1b)th via pad disposed in the first area of the fourth layer and physically coupled to a middle step of the first via; and a (1c)th via pad physically connected to the other end of the first via.

3. The antenna module of claim 1, wherein the second via comprises:

a (2a)th via pad disposed in the second area of the fifth layer and physically coupled to one end of the second via;

a (3b)th via pad disposed in the second area of the fifth layer and physically coupled to a middle step of the second via; and a (3c)th via pad physically connected to the other end of the second via.

4. The antenna module of claim 1, wherein the third via comprises:

a (3a)th via pad physically coupled to one end of the third via; and a (3b)th via pad physically coupled to the other end of the third via and embedded in a lower surface of a probe pad.

5. The antenna module of claim 1, wherein the fourth via comprises:

a (4a)th via pad physically coupled to one end of the fourth via; and a (4b)th via pad physically coupled to the other end of the fourth via and embedded in a second area of a lower surface of a probe pad.

6. The antenna module of claim 1, wherein the first feed line and the second feed line are electrically connected to a radio frequency integrated circuit (RFIC).

7. The antenna module of claim 6, wherein a first signal output from the RFIC is emitted through the second antenna patch via the first feed line, the first via, the third feed line, the third via, and a first area of the first antenna patch.

8. The antenna module of claim 6, wherein a second signal output from the RFIC is emitted through the second antenna patch via the second feed line, the second via, the fourth feed line, the fourth via, and a second area of the first antenna patch.

9. The antenna module of claim 1, further comprising:

a first shielding structure configured to surround a first side surface, a second side surface, and an upper surface of the first via; and a second shielding structure configured to surround a first side surface, a second side surface, and an upper surface of the third via, wherein the first shielding structure and the second shielding structure are arranged symmetrically with each other.

10. The antenna module of claim 9, wherein the first shielding structure comprises:

a first shielding via spaced apart by a predetermined distance from the first side surface of the first via;

a second shielding via spaced apart by a predetermined distance from the second side surface of the first via; and a first shielding cover configured to extend from one end of the first shielding via to one end of the second shielding via and spaced apart by a predetermined distance from the upper surface of the first via.

11. The antenna module of claim 10, wherein the first shielding via is configured to extend from the third layer to a height which is substantially equal to the first antenna patch, and wherein the second shielding via is configured to extend from the third layer to a height which is substantially equal to the first antenna patch.

12. The antenna module of claim 10, wherein the first shielding cover is disposed at a height which is substantially equal to the first antenna patch so as to be substantially parallel to a first side surface of the first antenna patch.

13. The antenna module of claim 10, wherein the second shielding structure comprises:

a third shielding via spaced apart by a predetermined distance from the first side surface of the second via;

a fourth shielding via spaced apart by a predetermined distance from the second side surface of the second via; and a second shielding cover configured to extend from one end of the third shielding via to one end of the fourth shielding via and spaced apart by a predetermined distance from the upper surface of the second via.

14. The antenna module of claim 13, wherein the third shielding via is configured to extend from the third layer to a height which is substantially equal to the first antenna patch, and wherein the fourth shielding via is configured to extend from the third layer to a height which is substantially equal to the first antenna patch.

15. The antenna module of claim 13, wherein the second shielding cover is disposed at a height which is substantially equal to the first antenna patch so as to be substantially parallel to the second side surface of the first antenna patch.

16. The antenna module of claim 13, further comprising:

a third shielding structure configured to surround a third side surface of the first via; and a fourth shielding structure configured to surround a third side surface of the third via, wherein the third shielding structure and the fourth shielding structure are arranged symmetrically with each other.

17. The antenna module of claim 16, wherein the third shielding structure comprises:

a fifth shielding via spaced apart by a predetermined distance from the third side surface of the first via; and a third shielding cover configured to extend from one end of the fifth shielding via to the first shielding structure.

18. The antenna module of claim 17, wherein the fifth shielding via is configured to extend from the third layer to a height which is substantially equal to the first antenna patch, and wherein the third shielding cover is disposed at a height which is substantially equal to the first antenna patch so as to be substantially perpendicular to a first side surface of the first antenna patch on a x-y plane.

19. The antenna module of claim 17, wherein the fourth shielding structure comprises:

a sixth shielding via spaced apart by a predetermined distance from the third side surface of the third via; and a fourth shielding cover configured to extend from one end of the sixth shielding via to the second shielding structure.

20. The antenna module of claim 19, wherein the sixth shielding via is configured to extend from the third layer to a height which is substantially equal to a probe pad, and wherein the fourth shielding cover is disposed at a height which is substantially equal to the probe pad so as to be substantially perpendicular to a second side surface of the probe pad on an x-y plane.

* * * * *